United States Patent
Unal et al.

(10) Patent No.: US 8,155,405 B2
(45) Date of Patent: Apr. 10, 2012

(54) SYSTEM AND METHOD FOR LESION SEGMENTATION IN WHOLE BODY MAGNETIC RESONANCE IMAGES

(75) Inventors: Gozde Unal, Plainsboro, NJ (US); Gregory G. Slabaugh, Princeton, NJ (US); Tong Fang, Morganville, NJ (US); Shawn Lankton, Atlanta, GA (US); Valer Canda, Erlangen (DE); Stefan Thesen, Dormitz (DE); Shuping Qing, Princeton, NJ (US)

(73) Assignee: Siemens Aktiengsellschaft, Munich (DE)

( * ) Notice: Subject to any disclaimer, the term of this patent is extended or adjusted under 35 U.S.C. 154(b) by 1066 days.

(21) Appl. No.: 12/045,327

(22) Filed: Mar. 10, 2008

(65) Prior Publication Data

US 2008/0260221 A1 Oct. 23, 2008

Related U.S. Application Data

(60) Provisional application No. 60/912,934, filed on Apr. 20, 2007, provisional application No. 60/953,708, filed on Aug. 3, 2007, provisional application No. 60/954,588, filed on Aug. 8, 2007.

(51) Int. Cl.
G06K 9/00 (2006.01)
G06K 9/34 (2006.01)
(52) U.S. Cl. ........ 382/128; 382/173
(58) Field of Classification Search ........ 382/128, 382/173
See application file for complete search history.

(56) References Cited

U.S. PATENT DOCUMENTS

| | | | |
|---|---|---|---|
| 6,535,623 B1 * | 3/2003 | Tannenbaum et al. | 382/128 |
| 2006/0056701 A1 * | 3/2006 | Unal et al. | 382/199 |
| 2006/0158447 A1 * | 7/2006 | McGraw et al. | 345/419 |
| 2008/0030497 A1 * | 2/2008 | Hu et al. | 345/419 |

OTHER PUBLICATIONS

Vezhnevets, 'Growcut—interactive multi-label N-D image segmentation by cellular automata', 2005, Proceeding of the 15th International Conference on Computer Graphics and Applications Graphic-Con 2005, pp. 150-156.*

* cited by examiner

Primary Examiner — Jack Berman
Assistant Examiner — Eliza Osenbaugh-Stewart

(57) ABSTRACT

A method for lesion segmentation in 3-dimensional (3D) digital images, includes selecting a 2D region of interest (ROI) from a 3D image, the ROI containing a suspected lesion, extending borders of the ROI to 3D forming a volume of interest (VOI), where voxels on the borders of the VOI are initialized as background voxels and voxels in an interior of the VOI are initialized as foreground voxels, propagating a foreground and background voxel competition where for each voxel in the VOI, having each neighbor voxel in a neighborhood of the voxel attack the voxel, and, if the attack is successful, updating a label and strength of the voxel with that of the successful attacking voxel, and evolving a surface between the foreground and background voxels in 3D until an energy functional associated with the surface converges in value, where the surface segments the suspected lesion from the image.

39 Claims, 19 Drawing Sheets

Algorithm: IterativeFgBgCompetition *(S, N, g)* comment: during each iteration for each $d \in \Omega$ comment: copy previous state $S_d^{t+1} = S_d^t$ comment: neighbors in *N* attack current cell for each $a \in N(d)$ if $g\left(\|v_a - v_d\|_2\right) \cdot s_a^t > s_d^{t+1}$ then

$l_d^{t+1} = l_a^t$ $s_d^{t+1} = g \cdot s_a^t$ end if end for end for

A general outlook of the MR Segmentation Application Graphical User Interface

Segmented lesion is represented in 3D (left) and 2D (right)

2D Pen Tool Editing.

3D Pen Tool Editing.

Live Wire Editing

3D Cutting Tool.

Adjusting Size Parameter.

Adjusting Smoothness Parameter.

Adjusting Bounding Box:

(a)

(b)
Adjusting Bounding Box depth-padding.

Lesion Segmentation Report.

(a)

(b)

Adjusting Seed Area.

SYSTEM AND METHOD FOR LESION SEGMENTATION IN WHOLE BODY MAGNETIC RESONANCE IMAGES

CROSS REFERENCE TO RELATED U.S. APPLICATIONS

This application claims priority from "A Lesion Segmentation Method for Whole Body Magnetic Resonance Imaging", U.S. Provisional Application No. 60/912,934 of Unal, et al., filed Apr. 20, 2007, "A Multi-Region Lesion Segmentation Method for Magnetic Resonance Imaging", U.S. Provisional Application No. 60/953,708 of Unal, et al., filed Aug. 3, 2007, and "A system for lesion segmentation and analysis in 3D whole body magnetic resonance images", U.S. Provisional Application No. 60/954,588 of Qing, et al., filed Aug. 8, 2007, the contents of all of which are herein incorporated by reference in their entireties.

TECHNICAL FIELD

This disclosure is directed to the development of an efficient and robust lesion and tumor segmentation algorithm for 3-dimensional (3D) whole body (WB) magnetic resonance (MR) imaging.

DISCUSSION OF THE RELATED ART

The goal of segmentation is to extract the object of interest from background. In medical imaging, segmentation plays an important role in clinical diagnosis. It supports various tasks such as lesion measurement and analysis, visualization, follow-up study and registration. A fully automatic segmentation is desirable but sometimes unattainable due to limitations imposed by image acquisition, as well as clutter from surrounding tissues, heterogeneous appearance, and weak boundaries. On the other hand, manual segmentation is very time-consuming and typically requires a lot of user interaction.

As a result, lesion segmentation can be performed using semi-automatic algorithms, which allow the clinical operator to efficiently delineate the target lesion boundaries from MR images of the whole body, such as thorax, abdomen, brain, and breast scans. The delineation of lesions is of importance for prognosis of disease, surgical planning and other therapeutic treatment. It facilitates automatic measurements such as the volume of the lesion, the 3D diameter of the lesion, and maximum in-plane diameter.

Lesions over the whole body have widely varying characteristics in both geometry and appearance. For instance, the lesions in the lung and liver may show a smoother geometry and have a lesser intensity variation, however, in general these observations do not hold and lesions typically have an irregular geometry and large variations in size, shape, and texture. Furthermore, MR sequences exhibit a varying resolution, from 0.4 mm to approximately 9 mm in-plane and in-depth.

Challenges in lesion segmentation include weak or missing lesion boundaries, textured lesions, and lesions of varying size, geometry and intensity. FIGS. 1(a)-(c) illustrate some of the challenges for the lesion segmentation. Vague and weak boundaries 11 and 13 are shown in FIGS. 1(a) and (c), and a region 12 with heterogeneous characteristics is shown in FIG. 1(b).

Heterogeneity in the medical structures appears in different ways, implicating different anatomic and pathological processes. For example, brain tumors usually include different tissue types, such as a necrotic (dead) part, an active part, and an edema or swelling nearby. FIG. 2(a) depicts a slice from a brain MRI showing a lesion with multiple tissue appearance, with bounding box 20 indicating a region-of-interest, while FIG. 2(b) shows an enlargement of the lesion region of interest. In such cases, the user may want to outline different parts of the tumor separately. For a multi-tissue segmentation application, different approaches may be taken, such as a multi-label segmentation approach or a hierarchical approach that targets different regions of the tumor at different times. For an initialization, a user can input a movable seed into the interior of a 2D box (region of interest) to indicate the dead part of the tissue, and a second set of seeds to indicate the active part. FIGS. 3(a)-(c) show the initializations for a brain lesion with multiple regions. FIG. 3(a) depicts the input set of seeds 31, 32, while FIGS. 3(b)-(c) depict the segmentation results 33, 34 with a hierarchical approach.

The assessment and volumetric analysis of lesions play an important role in applications such as prognosis of disease, surgical planning and evaluation of treatment response. For example, in a follow-up study, tumor growth-rate gives essential information for the radiologist to give high-level reasoning. A good lesion segmentation system provides radiologists with fast, accurate and robust delineation and visualization of lesion. It should require minimal user interaction to obtain satisfactory results.

SUMMARY OF THE INVENTION

Exemplary embodiments of the invention as described herein generally include methods and systems for a semi-automatic segmentation approach for 2D and 3D MR images with minimal user interaction. To begin a segmentation according to an embodiment of the invention, a user draws a 2D box. Segmentation is triggered by a user action, such as a single mouse click on a "segmentation" button. An algorithm according to an embodiment of the invention uses all available information, such as the region and edge characteristics of the lesions from the image intensity, and user input, such as box center, size, and location, to label some voxels as foreground and some as background to obtain a good initialization for the segmentation.

Further embodiments of the invention include multi-tissue segmentation algorithms based on this lesion segmentation approach. According to an embodiment of the invention, a multi-region segmentation approach for three regions uses two regions from the lesion and one region from the background. However, other embodiments of the invention can be generalized to more than three regions, for example by obtaining a third set of seeds to indicate a third part of the lesion. Then, one can apply a hierarchical framework according to an embodiment of the invention to segment three-region lesions or N-region lesions if required.

If the automated segmentation result is unsatisfactory, an embodiment of the invention provides a plurality of 2D and 3D interactive editing tools that can be applied on the segmentation. With the help of these editing tools, a user can further work on the segmented lesion in order to get a more accurate result. These interactions are user friendly and require minimal user interaction. Segmented lesions are presented in both 2D display and 3D rendering. A semi-automatic lesion segmentation system according to an embodiment of the invention that not only works on 3D MR images, but also can be used on other modalities such as CT and X-Ray images. A system according to an embodiment of the invention can handle the challenges of a manual segmentation.

According to an aspect of the invention, there is provided a method for lesion segmentation in 3-dimensional (3D) digital images, including providing a digitized 3D image, said image comprising a plurality of intensities associated with a 3D grid of voxels, selecting a 2D region of interest (ROI) from said 3D image, said ROI containing a suspected lesion, extending borders of said ROI to 3D forming a volume of interest (VOI), wherein voxels on said borders of said VOI are initialized as background voxels and voxels in an interior of said VOI are initialized as foreground voxels, propagating a foreground and background voxel competition wherein for each voxel in said VOI, having each neighbor voxel in a neighborhood of said voxel attack said voxel, and, if said attack is successful, updating a label and strength of said voxel with that of said successful attacking voxel, and evolving a surface between the foreground and background voxels in 3D until an energy functional associated with said surface converges in value, wherein said surface segments said suspected lesion from said image.

According to a further aspect of the invention, the neighborhood is a Moore neighborhood of 26 voxels surrounding said current voxel.

According to a further aspect of the invention, an attack is deemed successful if $g(\|v_a - v_d\|_2) \cdot s_{aa}^t > s_d^{t+1}$, wherein $v_x$ is an image intensity at voxel x, $s_x^t$ is a strength of voxel x at iteration step t, and g is an image characteristic function defined as $$g(v) = 1 - \frac{v}{\max_{\forall v} \|v\|}$$

wherein said maximum is evaluated over all voxels in said VOI.

According to a further aspect of the invention, the current voxel $s_d^t$ strength is updated according to $s_d^{t+1} = g(v_a) \cdot s_a^t$, wherein $s_a^t$ is a strength of said successful attacking voxel.

According to a further aspect of the invention, the method includes initializing said surface between the foreground and background voxels by converting said initial segmentation into a level set representation by computing weighted local intensity means and extending values from a zero level set, wherein said level set has values less than zero inside said initial surface, values greater than zero outside said initial surface and values equal to zero at the surface.

According to a further aspect of the invention, evolving said surface in 3D includes computing a surface evolution speed for each voxel along the zero level set according to $$\frac{\partial S}{\partial t} = \left[ \left( I - \frac{\int_{K_{in}} G(I) d\Omega}{\int_{K_{in}} d\Omega} \right)^2 - \left( I - \frac{\int_{K_{out}} G(I) d\Omega}{\int_{K_{out}} d\Omega} \right)^2 + \alpha \kappa \right] N,$$

wherein S represents said surface, I is the image intensity function, $\Omega$ is the domain of the VOI in the image, G(I) is a Gaussian kernel with zero mean and a predetermined standard deviation, $K_{in}$ and $K_{out}$ are truncated domains of the Gaussian kernel inside and outside the surface, respectively, $\kappa$ is a curvature function for smoothing the surface S, $\alpha$ is a weight of the smoothing, and N is a normal vector to the surface S, moving the surface by updating voxels representing said surface, and updating statistics of said Gaussian kernel and updating a narrowband about said updated surface.

According to a further aspect of the invention, the energy functional associated with said surface is of the form $$E(S) = \int [\chi_{in}(I - \text{mean}_{in})^2 + \chi_{out}(I - \text{mean}_{out})^2] d\Omega,$$

where $\chi$ is an indicator function for an interior or exterior of the surface S, $\Omega$ is the image domain, $I:\Omega \to R$ is the image intensity function, and $\text{mean}_{in/out}$ is a mean intensity of a region inside and outside the surface, respectively.

According to a further aspect of the invention, the method includes downsampling said VOI from an original resolution to a coarser resolution, propagating competing foreground and background voxels and evolving a surface between the foreground and background voxels in 3D to segment said lesion, and upsampling said segmentation to said original resolution.

According to a further aspect of the invention, the method includes displaying said segmentation result, providing an interface adapted for receiving editing commands for editing said segmentation result, and processing any such commands received through said interface.

According to a further aspect of the invention, the editing tools include a 2D pen enabling a user to select additional foreground or background voxels in a 2D region.

According to a further aspect of the invention, the editing tools include a 3D pen enabling a user to select additional foreground or background voxels in a 3D region.

According to a further aspect of the invention, the editing tools include a live-wire enabling a user to draw additional foreground or background points on a screen, and further comprising finding a shortest path between said drawn points.

According to a further aspect of the invention, the editing tools include a 3D cutting tool enabling a user to draw a line on a screen indicative of a cutting plane, and further comprising removing voxels from a segmented lesion based on a position of said cutting plane.

According to a further aspect of the invention, the editing tools include a parameter tuning tool enabling a user to adjust a size and smoothness of a segmented lesion According to a further aspect of the invention, the editing tools include a bounding box editor enabling a user to resize or reposition a bounding box in 2D, and to expand or shrink said bounding box along a third axis.

According to a further aspect of the invention, the editing tools include a seed area selector enabling a user to indicate an area where a lesion is located, and to resize or reposition said area.

According to another aspect of the invention, there is provided a program storage device readable by a computer, tangibly embodying a program of instructions executable by the computer to perform the method steps for lesion segmentation in 3-dimensional (3D) digital images.

BRIEF DESCRIPTION OF THE DRAWINGS

FIGS. 5(a)-(b) show a flowchart and pseudocode of a first step of a lesion segmentation method according to an embodiment of the invention.

DETAILED DESCRIPTION OF EXEMPLARY EMBODIMENTS

Figure 1:
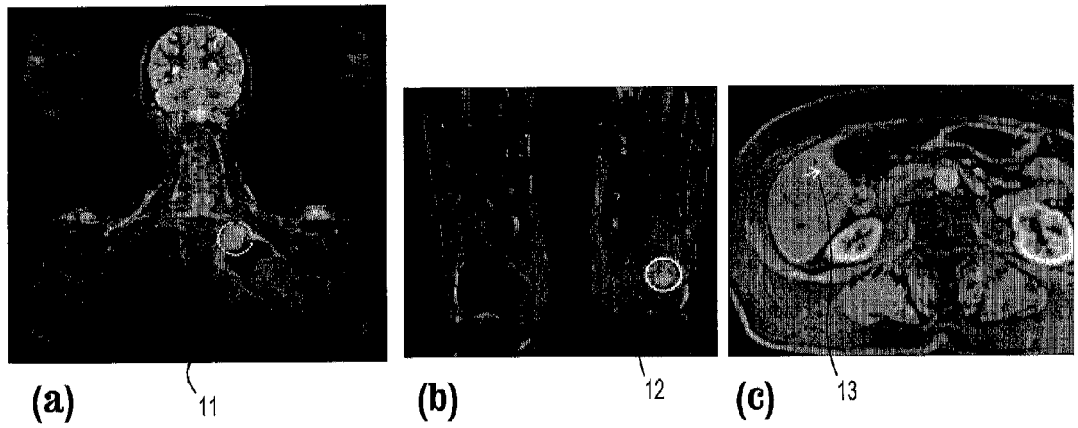
FIGS. 1(a)-(c) illustrate some of the challenges for the lesion segmentation, according to an embodiment of the invention.

Exemplary embodiments of the invention as described herein generally include systems and methods for an efficient and robust lesion and tumor segmentation algorithm for 3-dimensional whole body magnetic resonance imaging. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2-or 3-dimensional image, the domain of the image is typically a 2-or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Lesion Segmentation

According to an embodiment of the invention, it is desired to account for, as much as possible, the challenging scenarios of WB MR lesion segmentation, due to the wide variety of texture, appearance, and geometry. An algorithm according to an embodiment of the invention should be able to utilize data from the intensity characteristics of lesions by analyzing both edge information and more global region information, and to utilize a fully 3D approach.

Figure 4:
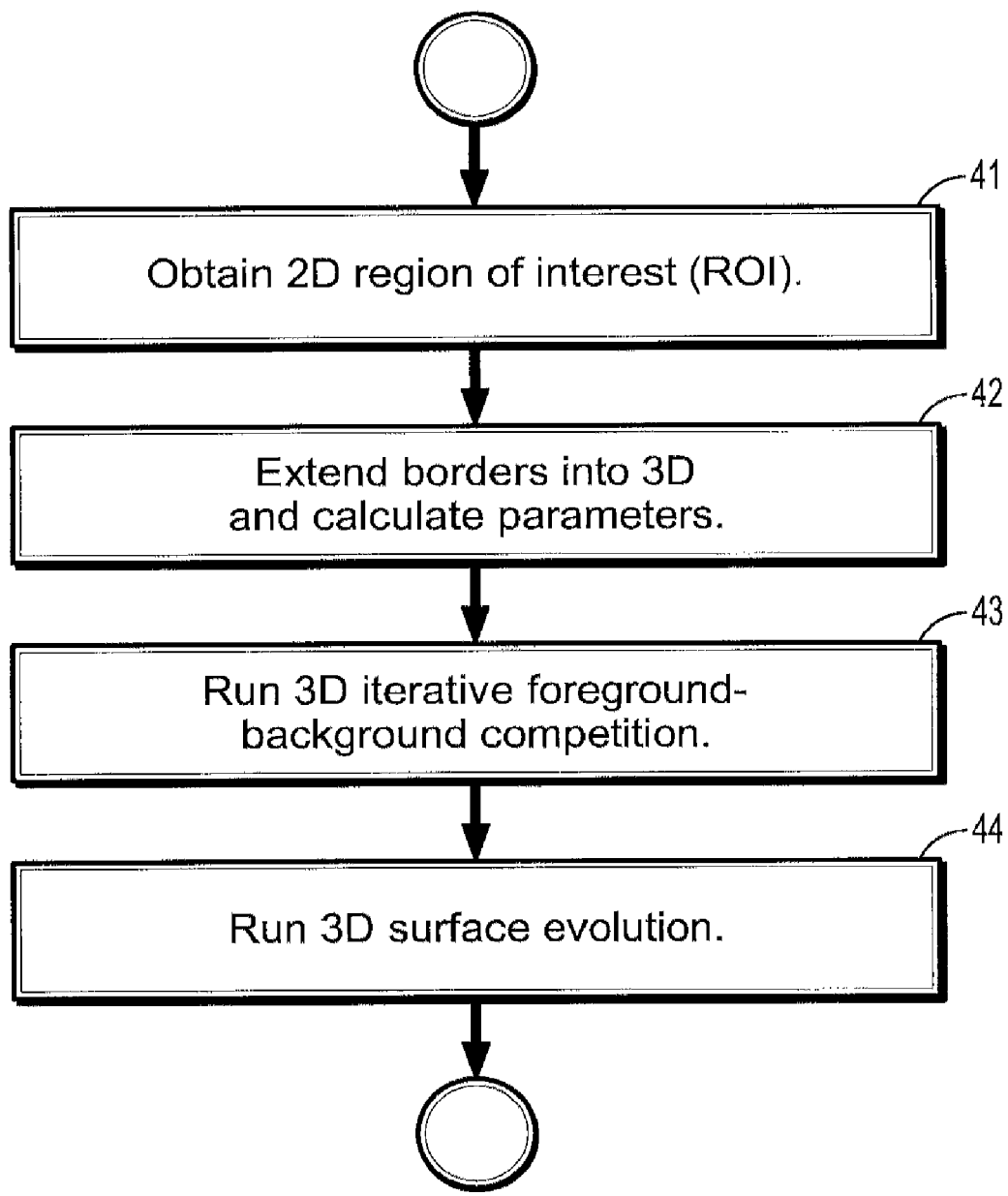
FIG. 4 is a flowchart of a lesion segmentation method according to an embodiment of the invention.

Recent segmentation techniques have been based on graph theory, active surfaces (surface propagation by differential equations), and cellular automata. An algorithm according to an embodiment of the invention utilizes a combination of two segmentation ideas: an iterative label marching approach followed by a surface propagation approach to delineate the lesion boundaries. A flowchart of a lesion segmentation method according to an embodiment of the invention is shown in FIG. 4. Referring now to the flowchart, an algorithm begins at step 41 by providing a 2-dimensional (2D) region of interest (ROI), and at step 42, extending the borders into 3D and calculating the relevant parameters. The ROI can be provided by having a user drawing a 2D rectangle, which leads to a set of constraints for the foreground, which is the target lesion, and the background. The 3D ROI borders are labeled as background voxels (seeds), and the center of the ROI and its immediate neighbors are labeled as the foreground voxels (seeds). The center of the ROI can be moved about the inside of the ROI for a flexible initialization. All other voxels are initially labeled as unassigned. The parameters are described below.

A method according to an embodiment of the invention includes two other steps. First, at step 43, a 3D iterative foreground and background competition based on cellular automata is executed. Next, at step 44, a surface propagation algorithm in 3D space based on partial differential equations is executed. The steps of a segmentation according to an embodiment of the invention are explained in the following subsections.

Data Description and Parameter Setting

Lesions can be located anywhere in the body, including lungs, liver, breast, brain, knee, shoulder, spine, bones, and so on. MRI scans typically have a wide variety of resolution and contrast changes, hence a method according to an embodiment of the invention should automatically adapt to such different conditions.

The parameters can be classified as follows:

1. Padding parameters: As the user draws a 2D rectangle, i.e. a region of interest (ROI), enclosing the lesion on a single image slice, an automatic extension of this rectangle to a 3D volume of interest (VOI) is required. The volume is padded in the x, y, and z directions. For additional flexibility in setting the VOI close to the MRI volume borders, six parameters are utilized that pad the VOI from left, right, up, down, front, and end directions. In-plane padding is more straightforward since the 2D ROI already gives an estimate of the size of the lesion. For the padding of the dimension of the lesion in depth, an estimation is made based on the rough lesion size in 2D.

2. Gaussian kernel variance parameters: For incorporating image region characteristics to drive the estimation of the lesion surface, 3D Gaussian kernels are used. The σ parameter, i.e. the standard deviation of the Gaussian function, in three different directions $\sigma_x$, $\sigma_y$, $\sigma_z$ plays a role in a reliable estimation of the lesion borders. They will be estimated based on the input lesion size in 2D, and the MR image volume resolutions.

3. Smoothness parameter: This parameter is a weight to set the amount of curvature smoothing performed on the estimated lesion surface.

The parameters in items 1 and 2 above can be adaptively set. An experimental dataset of 101 lesions from all over the body, marked by clinicians, is used. For this purpose, a subset of this dataset of lesions is used as a training set, and a set of parameters is hand-tuned for those selected. Then, a multidimensional regression plane is found that maps the inputs 2D ROI size in the x and y directions, and maps the resolution of the volume in 3 directions $x_{res}$, $y_{res}$, $z_{res}$ to the padding and the σ parameters.

There are other parameters, such as the smoothness parameter, which are fixed heuristically during experiments. For example, in one embodiment of the invention, the number of voxels that can be processed in five seconds is set from experiments and used to determine when faster coarse-level methods must be used. In addition, the minimum number of pixels allowed on a slice is set to avoid very small segmentations or protrusions. Finally, although padding parameters are set adaptively, there are hard constraints set to ensure that an adaptive algorithm does not make the segmented lesions too large or too small, regardless of volume meta-data.

3D Iterative Foreground and Background Competition

Three dimensional interactive approaches to image segmentation have been popular in recent developments in the graph-theory based segmentation methods such as graph-cuts. These methods treat the image as a graph, where each pixel is a graph node. A global optimization is solved for labeling all the pixels in the image by one of the region labels. For example, in a binary segmentation, the labels include a foreground label and a background label. Although graph-cut methods have been successful, they have a drawback in that there is less flexibility in setting the graph, i.e. adjusting the edge weights of the graph and the coefficients of the cost function. Another is that smoothness of the object boundary is not naturally controlled since in this optimization framework, there is no sense of a single topological surface that represents the lesion.

Another 3D interactive segmentation approach is based on an iterative marching from foreground seeds and background seeds, where the marching is coupled as the foreground and background labels propagate towards unassigned voxels. These approaches are based on cellular automata, and have been used to model various dynamical systems, for instance biological systems. A simple analogy is two types of bacteria cells (labeled voxels) that initially reside on a set of grid points (image volume) that fight to gain territory by attacking and conquering other cells.

In a method according to an embodiment of the invention, while foreground seeds march outwards to meet background seeds marching inwards, there will be a fight over territory around the real lesion boundaries. This couples the marching of the foreground and the background labels. While the interior of the lesion may be heterogeneous and its surroundings may have distracting structures, the background seeds propagate inwards from all sides of the 3D VOI, and the foreground seeds propagate outwards in 3D, and both can march through the noisy environments in and around the lesion. A method according to an embodiment of the invention utilizes this 3D iterative, coupled marching scheme based on cellular automata as a first step of the segmentation to achieve an initial estimate of the lesion boundaries.

Cellular automata are constructed in discrete space and time, and operate on a lattice of sites x (i.e. voxels) over the image domain $\Omega \in R^n$. A cellular automaton is defined by the triplet (S, N, p), where S is a state set (label set), N is the neighborhood system, and p is the local transition rule, which determines the state of the cell at the time step t+1 given the states of the neighborhood cells at previous time step t. In a method according to an embodiment of the invention, a Moore neighborhood is used, which is a 26 neighbor system in 3D that considers all neighbors of the current voxel with a distance of unit $L_\infty$ norm.

Each cell state $S_x$ has the following attributes: a label $l_x$, a strength function $s_x$, and an associated image intensity $v_x$. An exemplary, non-limiting strength function has values in the range from 0.0 to 1.0. The initial strength weights are set to one for the seed voxels. All other voxels are unknown. As the competition progresses, the strength of the unknown voxels are determined. A design criterion here is the construction of an attack rule that defines the propagation strength of labels. For a segmentation application, an exemplary, non-limiting rule is based on the state $S_x$ and an image characteristic function $$g(v) = 1 - \frac{v}{\max_{\forall v} \|v\|}$$

of the current cell, with $v=(\|v_a-v_d\|_2)$ being the discrete approximation to the derivative of the image intensity between neighboring voxels a and d. Upon completion of the competition, all voxels have a strength value.

Figure 5A:
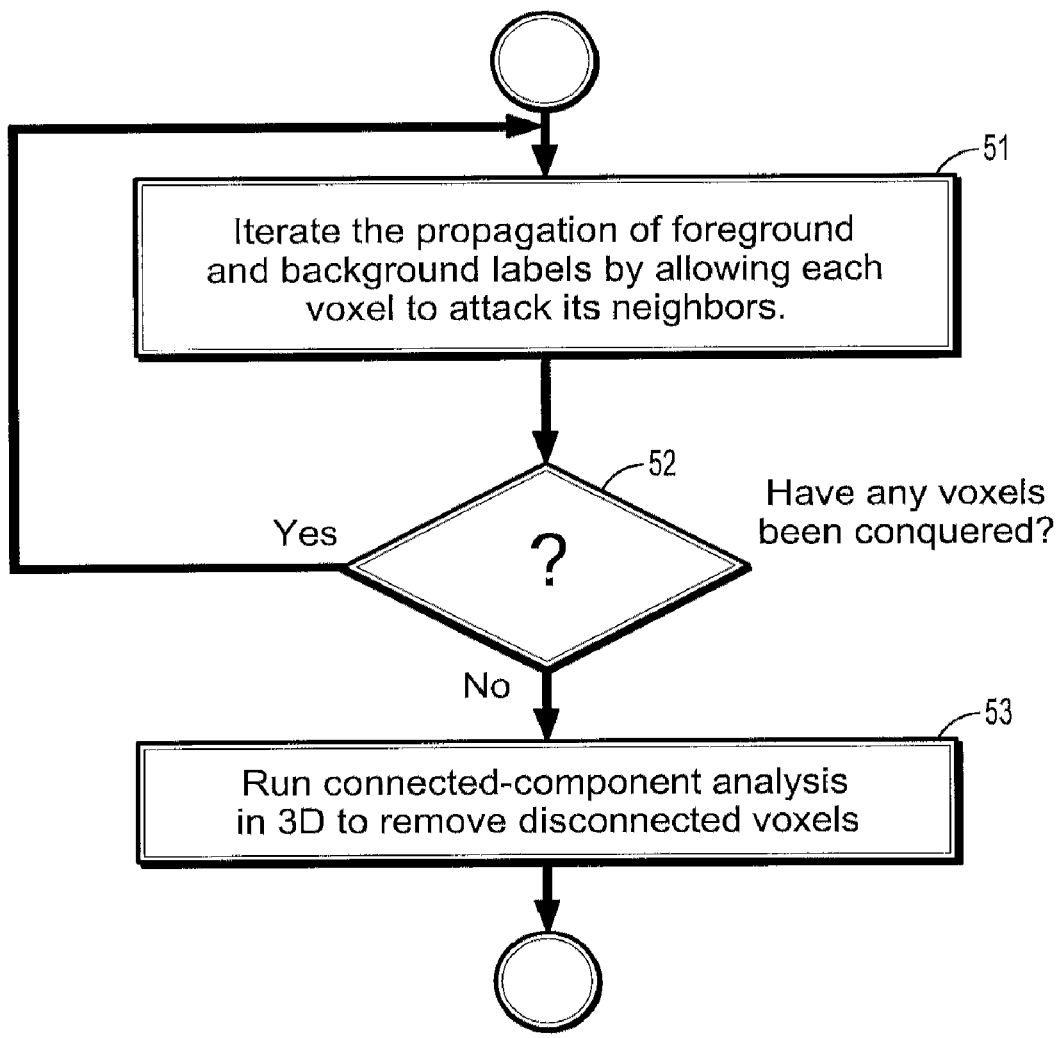

A flowchart and pseudocode for a first step of a lesion segmentation method according to an embodiment of the invention are shown in FIGS. 5(a)-(b). Referring to FIG. 5(a), this first step begins at step 51 by iterating the propagation of the foreground and background labels by allowing each voxel to attack its neighbors. Pseudocode for the foreground/background propagation is presented in FIG. 5(b).

Referring now to FIG. 5(b), an IterativeFgBgCompetition routine according to an embodiment of the invention is invoked for each iteration of the propagation. The routine loops overt all voxels d in the image domain, and initializes the current state to the previous state. In the inner loop, each neighbor voxel a in the Moore neighborhood of d attacks voxel d by comparing the product of the image characteristic function g for the voxels d and a and the strength function for voxel a with the strength function fort voxel d. If the attack is successful, the label and strength function of voxel d are updated based on the values for voxel a.

This algorithm reaches convergence when no voxel conquers any other voxel. After this point, no strengths or labels will change. Referring again to FIG. 5(a), this is detected at step 52 by monitoring successful attacks. When there are none, the algorithm has reached convergence.

After this phase there can be foreground voxels completely disconnected in 3D from the original foreground seed points.

These disconnected segmentations are typically parts of nearby, but separate structures with similar intensity characteristics. At step 53, according to an embodiment of the invention, these are removed before the next phase by running a 3D connected component analysis which removes foreground pixels lacking a connection in 3D to the original foreground seed points.

Figure 6:
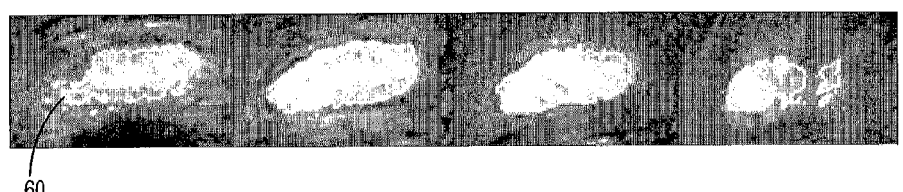
FIG. 6 depicts results of a first segmentation step of a method according to an embodiment of the invention.
Figure 6:
Figure 6:
Figure 2:
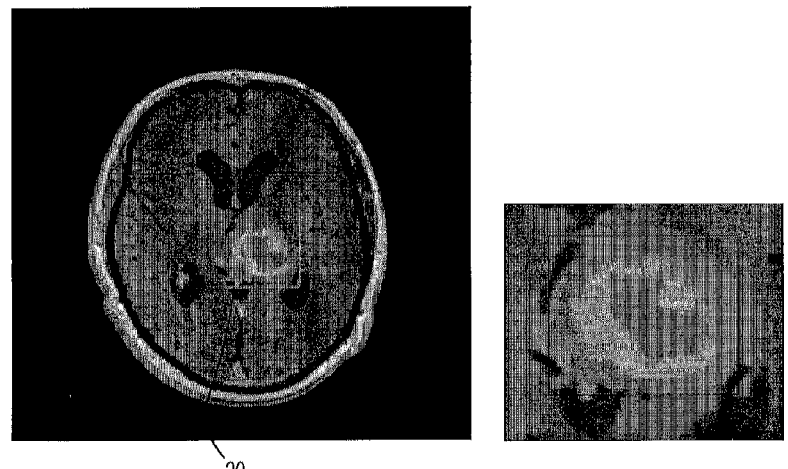
FIGS. 2(a)-(b) illustrate different tissue types of brain tumors, according to an embodiment of the invention.

Examples of input seeds and results of the first segmentation step are shown in FIG. 6. Referring to the figure, each row shows a different result from the first step. The result is indicated by the bright contour 60, indicated only for the upper left image for clarity. Recall that an algorithm according to an embodiment of the invention runs in 3D. Since this is difficult to show on the page, each individual image in a row corresponds to a difference slice through the 3D volume. The four rows show the results on four different lesions. The results depicted in this figure show that the output from the competition algorithm is good, but not completely accurate, as the result may have undesirable topological features, such as holes and disconnected contours (especially in 2D), and the lesion boundaries estimates are ragged. Thus, the extension of the labels to unassigned voxels over the VOI is successful. This leads to a second step of a segmentation method according to an embodiment of the invention, based on level sets, explained in the next section.

Surface Propagation in 3D Space

Active surface methods have been popular recently in image segmentation. Starting with an initial surface, these methods use differential equations derived from a cost function that depends on the surface boundary and regions partitioned in the image domain by the surface to drive the surface towards a target object in a given image. The surface can propagate with an edge-based energy that monitors pointwise image intensity gradients over the image, also known as the geodesic active surface, or with a region based energy that assumes piecewise smooth functionals inside and outside the surface. In the latter case, the surface propagates by monitoring certain statistics inside and outside the surface.

The most widely used region-based energy is the one that tries to maximally separate the mean intensity inside and outside the surface:

$$E(S) = \int [\chi_{in}(I - \text{mean}_{in})^2 + \chi_{out}(I - \text{mean}_{out})^2] d\Omega, \quad (1)$$

where $\chi$ is an indicator function for interior or exterior of the surface S, $\Omega$ is the image domain, $I: \Omega \to R$ is the image intensity function evaluated at each point of the domain, and mean is the mean image intensity over a region inside and outside the surface, respectively. The Euler-Lagrange equations of this energy leads to a partial differential equation of the form:

$$\frac{\partial S}{\partial t} = [(I - \text{mean}_{in})^2 - (I - \text{mean}_{out})^2 + \alpha \kappa] N, \quad (2)$$

where $\kappa$ is the curvature function for regularizing and smoothing the solution surface, $\alpha$ is the weight of smoothing, and N is the normal vector to the surface.

A convenient representation scheme for the active surface over the image domain $\Omega \in R^3$ is an implicit representation known as the level-sets representation in which the surface S is embedded implicitly as the zero-level of a signed distance function $\Phi: R^3 \to \Omega$:

$$S = \{(x,y,z) \in \Omega | \Phi(x,y,z) = 0\}, \quad (3)$$

where $\Phi(x,y,z) < 0$ inside, and $\Phi(x,y,z) > 0$ outside the surface.

The piecewise constant image assumption for the image regions, which uses the simple mean statistics inside and outside the surface, is not adequate to address the complex scenarios of medical imaging applications such as the lesion segmentation. Similarly, using only image gradient-based characteristics will be prone to noise and can easily converge to a wrong local minima of the cost functional, not far from the initial position of the surface.

Instead of a global statistics approach, a method according to an embodiment of the invention uses an active surface that considers statistics only in a band around itself with a specified radius. According to an embodiment of the invention, the following surface update equation is adopted, which monitors 3D Gaussian kernel mean values in regions around each voxel on the surface:

$$\frac{\partial S}{\partial t} = \left[ \left( I - \frac{\int_{K_{in}} G(I) d\Omega}{\int_{K_{in}} d\Omega} \right)^2 - \left( I - \frac{\int_{K_{out}} G(I) d\Omega}{\int_{K_{out}} d\Omega} \right)^2 + \alpha \kappa \right] N, \quad (4)$$

where G denotes the Gaussian kernel with zero mean and standard deviation $\sigma$, and K is the truncated domain of the Gaussian kernel function in 3D. One feature of using a surface propagation technique based on level sets is the inherent smoothness provided by the surface curvature term in the surface update equation (4).

The surface is evolved by altering a level set function, which is implemented in a 3D grid of voxels. Although it is possible to update every single voxel in the 3D level set function, this is not efficient since only the voxels near the surface are of interest. Thus, according to an embodiment of the invention, a narrowband is defined around the surface, which is represented as the zero-level set. One then evolves the voxels in the narrowband. This works provided the surface is within the narrowband. Therefore, as the surface moves, the narrowband is updated as well. The size of the narrowband is independent of the truncated domains $K_{in}$ and $K_{out}$. The truncated domains are used to compute the local means inside and outside the contour. The narrowband is used for efficient surface evolution.

As an active surface initialization, the segmentation map obtained at the end of the first step of an algorithm according to an embodiment of the invention is converted to a level set representation and is used as the initial surface at time $t=0$. Then the update equation (4) propagates the surface S until convergence.

Figure 7:
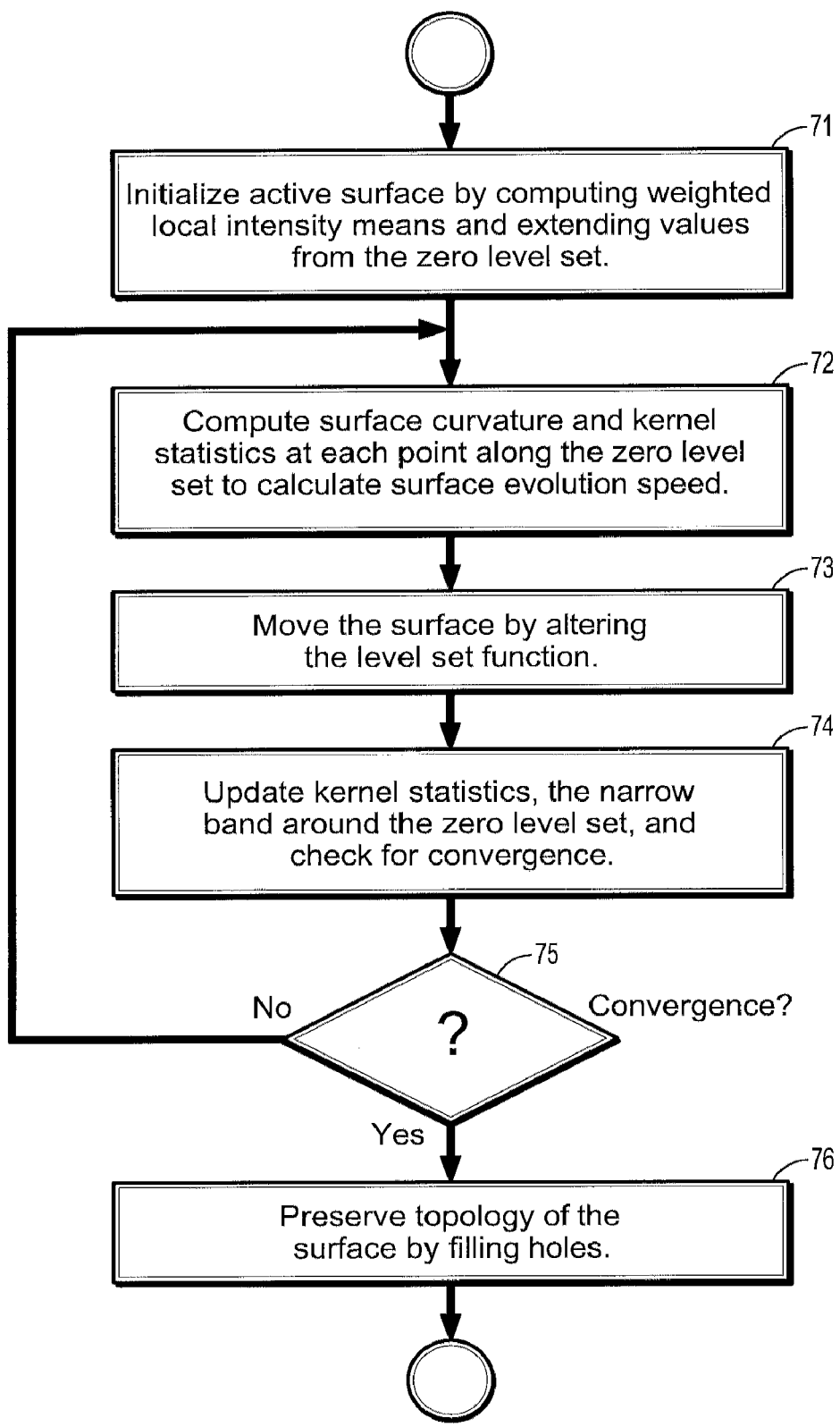
FIG. 7 is a flowchart of a second step of a segmentation method according to an embodiment of the invention.

A flowchart of the second step of a segmentation method according to an embodiment of the invention is shown in FIG. 7. Referring now to the flowchart, a second step begins at step 71 by initializing the active surface by computing weighted local intensity means and extending values from the zero level set. At step 72, the surface curvature and the quantities $$\left( I - \frac{\int_{K_{in}} G(I) d\Omega}{\int_{K_{in}} d\Omega} \right)^2 \text{ and}$$

$$\left( I - \frac{\int_{K_{out}} G(I) d\Omega}{\int_{K_{out}} d\Omega} \right)^2$$

in the left hand side of EQ. 4 are computed for each point along the zero level set to calculate the surface evolution speed at each point along the zero level set.

At step 73, the surface is moved according to EQ. (4). According to an embodiment of the invention, EQ. (4) is solved by altering the level set function in the narrow band of voxels about the surface. Then, at step 74, since the surface has moved, a narrow band about the zero level set is recalculated, and the kernel statistics are updated by updating the local means inside and outside the contour. The standard deviation need not be recalculated because it is fixed.

Convergence is checked at step 75. To determine when the surface evolution has reached convergence, the energy of the evolving surface is measured at each iteration. According to an embodiment of the invention, in evaluating the energy functional in EQ. (1), the level set function serves as the indicator function. When that energy remains constant within a threshold for a set number of iterations, the surface is assumed to be at steady state and no further iterations are required. Then, at step 76, the surface topology is preserved by filling in holes.

Figure 8:
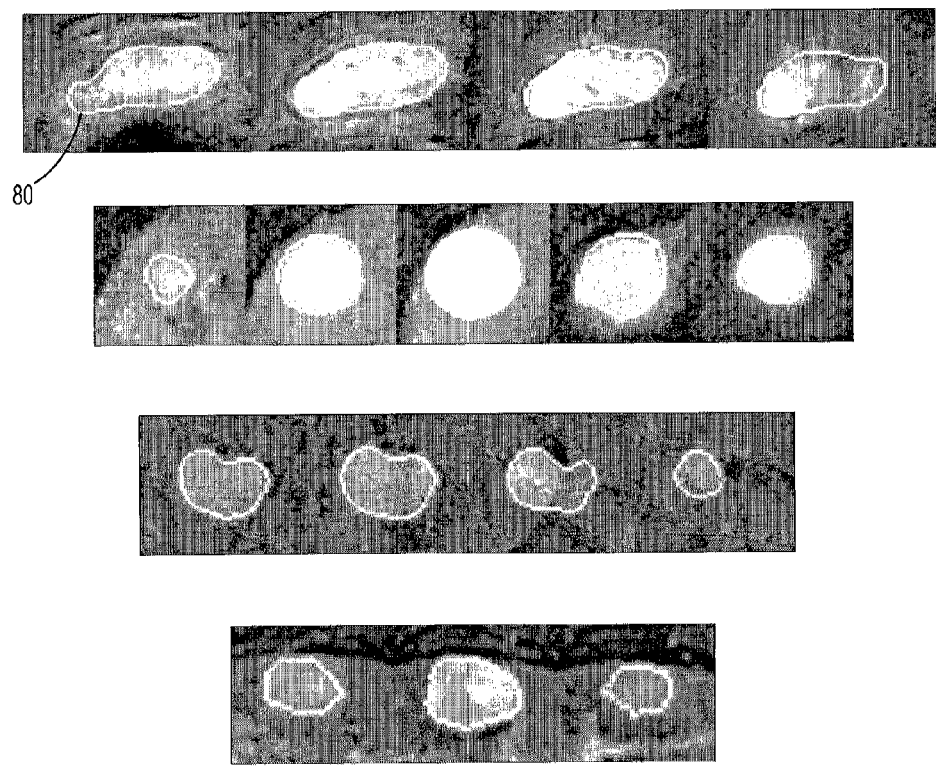
FIG. 8 depicts results of a second segmentation step of a method according to an embodiment of the invention.

Examples of initial surfaces and results of the second segmentation step are shown in FIG. 8. Referring to the figure, as with FIG. 6, each individual image in a row corresponds to a difference slice through the 3D volume, and the four rows show the results on four different lesions. Again the result is indicated by the bright contour 80, identified for the upper left image. The four lesions depicted here are the same as those shown as in FIG. 6, but now after a complete segmentation. Notice that the results follow the boundaries of the lesion, have a simple topology, and are smooth.

Multi-Resolution Approach for Large Lesions

For an interactive experience with the medical imaging tools provided to the clinicians, there are computation time constraints to a lesion segmentation algorithm according to an embodiment of the invention. The size of the lesion changes the VOI in 3D and directly affects the algorithm computational load. In the datasets used for testing, a wide spectrum of lesion sizes was observed, from very small (100 mm$^3$) to very large (500 cm$^3$). Hence, very large lesions, whose sizes are above a threshold that is determined by the given speed requirements, can be processed at a coarser subscale, and the results up-sampled from the coarse scale to the original finer scale of the VOI. This speeds up the segmentation process and respects the interactivity of the segmentation environment. The trade-off is that the fine resolution of the lesion borders is lost and the final surface is quite smooth, sometimes obscuring fine level detail.

Figure 9:
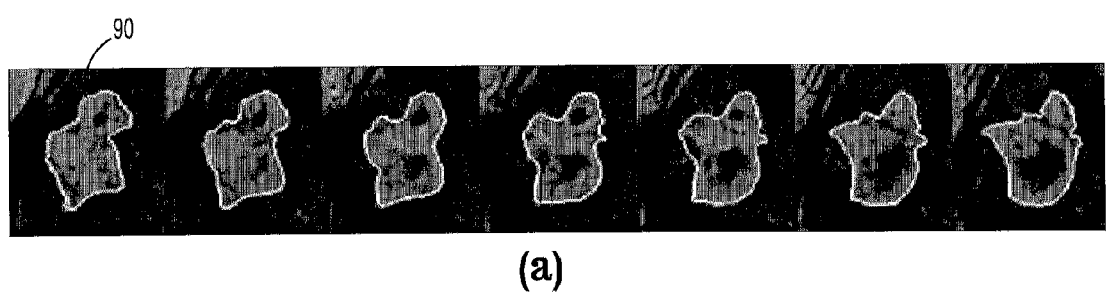
FIGS. 9(a)-(b) shows a segmentation example for a large lesion that exemplifies the trade-off between fine details and speed, according to an embodiment of the invention.
Figure 9:
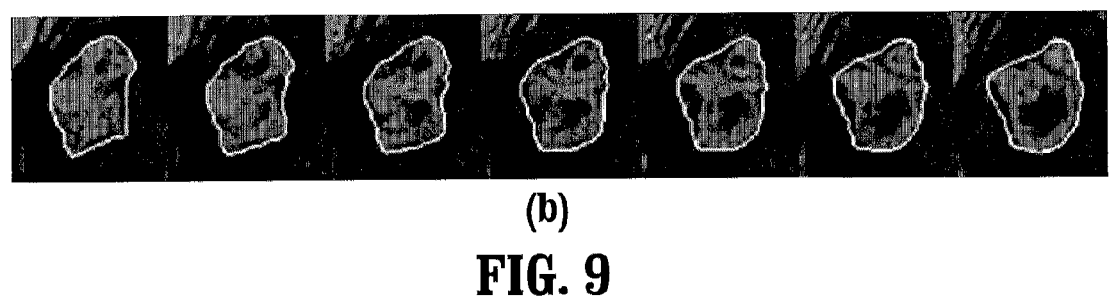
Figure 10:
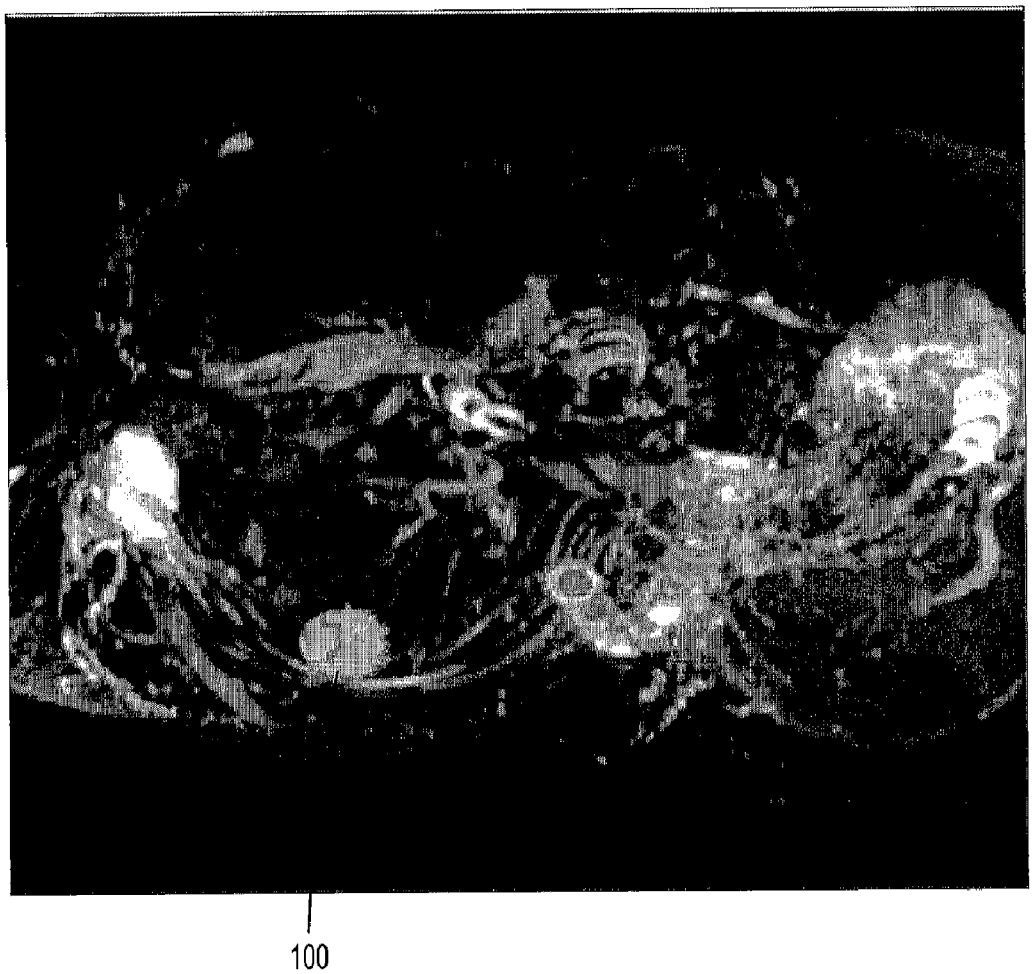
FIG. 10 illustrates a visualization of a 3D segmentation result using a maximum intensity projection.

FIGS. 9(*a*)-(*b*) shows a segmentation example, indicated by the bright contours identified by reference number 90 for the upper left image, for a large lesion that exemplifies the trade-off between fine details and speed. FIG. 9(*a*) shows a fine segmentation in 60.84 seconds, while FIG. 9(*b*) shows a coarser but fast segmentation in 3.78 seconds. FIG. 10 illustrates a visualization 100 of a 3D segmentation result using a maximum intensity projection.

Multi-Tissue Segmentation

Further embodiments of the invention include multi-tissue segmentation algorithms based on the above lesion segmentation method according to an embodiment of the invention. A multi-label competition according to an embodiment of the invention is similar to a two-label competition except that it uses more seed regions. For the purpose of clarity, an example is described having 3 regions. However, one of ordinary skill in the art can easily extend methods described herein below to lesions having multiple regions embedded within each other.

An exemplary, non-limiting multi-label surface evolution uses two nested level set functions. Let the first surface be the zero level set of the first level set function, composed of regions $N_1$ inside and $P_1$ outside the surface. Similarly, let the second surface be the zero level set of the second level set function, composed of regions $N_2$ inside and $P_2$ outside the surface. The first zero level set is contained within the second zero level set. $N_1$ is a subset of $N_2$. The background region is given by $P_1 \cap P_2$, or equivalently, $N_2 4 P_2$. The inner, necrotic part of the tumor is given by $N_1 \cap N_2 = N_1$. The outer, active part of the tumor is given by $P_1 \cap N_2 = N_2 - N_1$. Finally, $P_2 \cap N_1$ is the empty set, because $N_1$ is a subset of $N_2$. Both surfaces in a multi-label level set implementation evolve until they converge, and the different regions can be identified as above.

A hierarchical technique according to an embodiment of the invention for a first phase of the multi-tissue segmentation task, a 3D iterative foreground and background competition, is as follows. Three sets of seeds are used to seed three regions: region 1, region 2, and background. The seeds of region 1 are identified by the center seeds in the VOI, the seeds of region 2 are a second set of foreground seeds, and the borders of the VOI are the background seeds. A segmentation algorithm according to an embodiment of the invention is run, using a label competition to segment the overall lesion, represented by regions 1 and 2, from the background. Next, a segmentation algorithm according to an embodiment of the invention is again run on the interior of the lesion to segment region 1 from region 2. Hence, all voxels are labeled as either as the background, region 1, or region 2.

A multilabel technique, according to an embodiment of the invention for a first phase of the multi-tissue segmentation task, a 3D iterative foreground and background competition, is as follows. Three sets of seeds are used to seed three regions: region 1, region 2, and background. The seeds of region 1 are identified by the center seeds in the VOI, the seeds of region 2 are a second set of foreground seeds, and the borders of the VOI are the background seeds. A multi-way competition is performed, where foreground seeds from regions 1 and 2 march outwards to meet background seeds marching inwards, and there will be a fight over territory around the real lesion boundaries. A method according to an embodiment of the invention utilizes this multi-way 3D iterative, coupled marching scheme based on cellular automata as a first step of the segmentation to achieve an initial estimate of the lesion boundaries. Hence, all voxels are labeled as either as the background, region 1, or region 2.

A hierarchical technique according to an embodiment of the invention for a second phase of the multi-tissue segmentation task, surface propagation in 3D space is as follows. Starting from the result of phase 1, the voxels corresponding to the overall lesion, represented by regions 1 and 2, are segmented from the background using a single level set function. Then, the overall lesion is segmented into two different regions, again using a single level set function. Hence, all voxels are labeled as either as the background, region 1, or region 2.

A multi-label technique according to an embodiment of the invention for a second phase of the multi-tissue segmentation task, surface propagation in 3D space, is as follows. Two nested level set functions are used to define three regions: background, region 1, region 2. The result from phase 1 is input into these three regions. Then, a multi-phase level set evolution using coupled partial differential equations is run to propagate the two surfaces that correspond to the two separate regions of the lesion to capture multiple parts of the lesion. Hence, all voxels are labeled as either as the background, region 1, or region 2.

Figure 25:
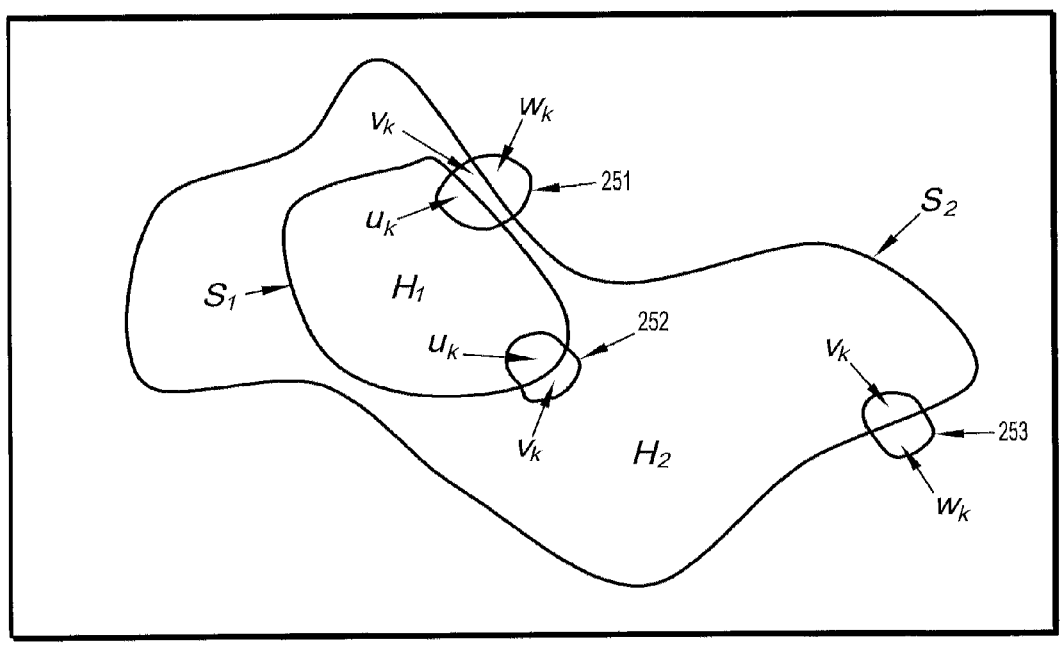
FIG. 25 depicts nested surfaces for a multiphase segmentation according to an embodiment of the invention.

FIG. 25 depicts nested surfaces $S_1$ and $S_2$ for a multiphase segmentation according to an embodiment of the invention. The regions are identified by the indicator functions $H_1$ and $H_2$, and three ball shaped regions of integration 251, 252, and 253 are shown. In the ball shaped regions, $u_k$ is the kernel mean inside surface $S_1$, computed over a ball using the voxels inside surface $S_1$, $v_k$ is the kernel mean computed over a ball using voxels outside surface $S_1$ and inside surface $S_2$, and $w_k$ is the kernel mean compute over a ball outside both surfaces. The kernel means can be calculated according to the formulae:

$$u_k = \frac{\int_B H_1(x)H_2(x)k(x)I(x)dx}{\int_B H_1(x)H_2(x)k(x)dx},$$

$$v_k = \frac{\int_B (1-H_1(x))H_2(x)k(x)I(x)dx}{\int_B (1-H_1(x))H_2(x)k(x)dx},$$

$$w_k = \frac{\int_B (1-H_1(x))(1-H_2(x))k(x)I(x)dx}{\int_B (1-H_1(x))(1-H_2(x))k(x)dx},$$

where B indicates a ball region, $H_i$ is a Heaviside step function that is a function of the level step function, k is the kernel, and I is the image intensity inside the ball. Once the kernel means have been calculated, the two surfaces are evolved using the following equations:

$$\frac{\partial S_1}{\partial t} = [(I-u_k)^2 - (I-v_k)^2 - (I-w_k)^2 + \alpha \kappa_1]N_1,$$

$$\frac{\partial S_2}{\partial t} = [(I-v_k)^2 - (I-u_k)^2 - (I-w_k)^2 + \alpha \kappa_2]N_2.$$

Figure 3:
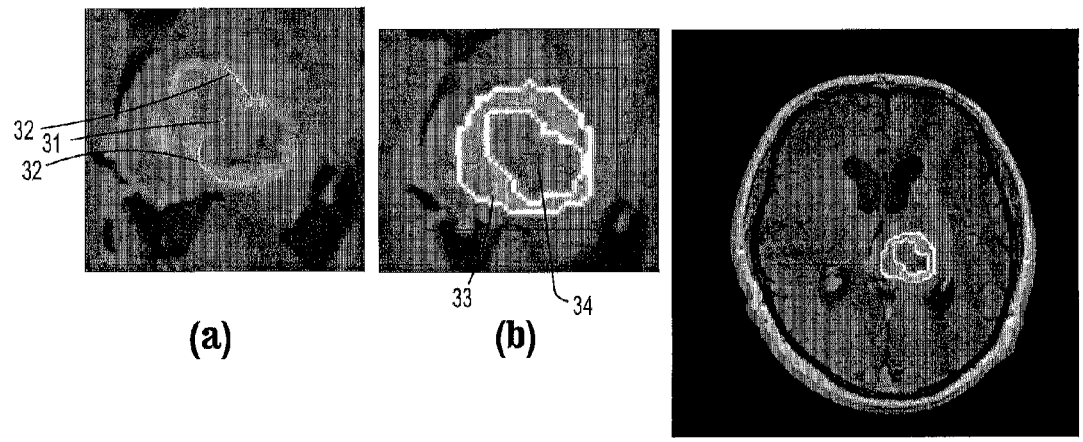
FIGS. 3(a)-(c) show the initializations for a brain lesion with multiple regions, according to an embodiment of the invention.

FIGS. 3(a)-(b) illustrates the hierarchical approach for the first phase and hierarchical approach for the second phase of the multi-tissue segmentation approach for brain lesion segmentation. FIG. 3(a) shows the region of interest with dead tissue seeds 31 and active tissue seeds 32. The result of a 3D lesion segmentation algorithm according to an embodiment of the invention is shown in the region of interest in FIG. 3(b) and on the whole 2D slice in FIG. 3(c), with surrounding region 33 and interior region 34.

Figure 11:
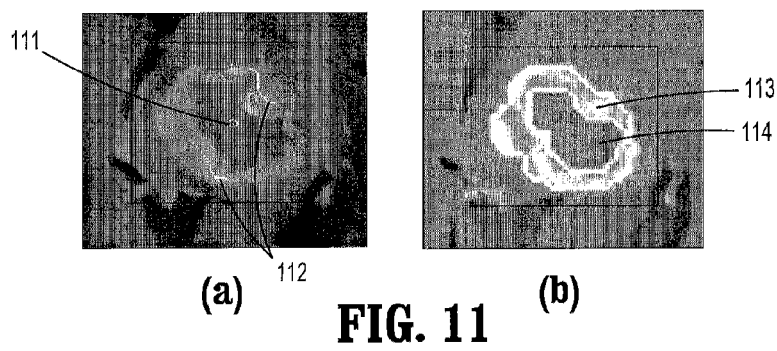
FIG. 11 illustrates a hierarchical approach for brain lesion segmentation, according to an embodiment of the invention.

FIG. 11 illustrates the hierarchical approach for the first phase and the multi-label approach for the second phase of the multi-tissue segmentation approach for brain lesion segmentation. FIG. 11(a) shows the region of interest with dead tissue seeds 111 and active tissue seeds 112. The result of 3D lesion segmentation algorithm is shown in the region of interest in FIG. 11(b), with surrounding region 113 and interior region 114.

Graphical User Interaction

Figure 12:
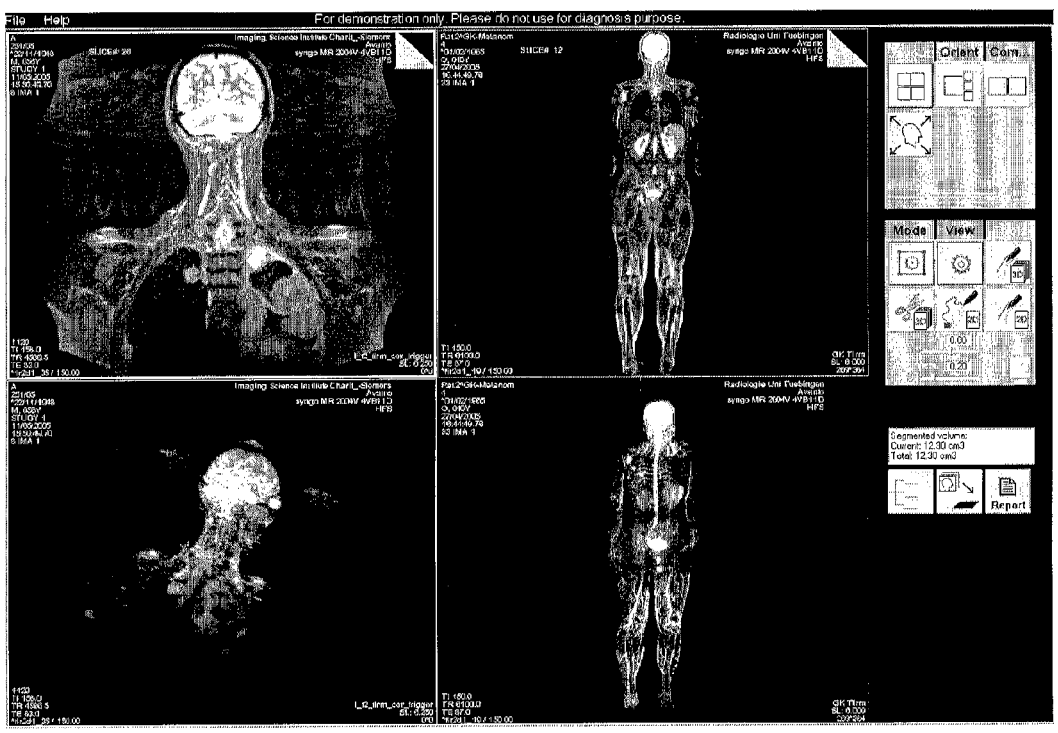
FIG. 12 illustrates a typical graphical user interface of a MR segmentation editing application, according to an embodiment of the invention.

FIG. 12 illustrates an exemplary graphical user interface of a MR segmentation editing application according to an embodiment of the invention. The system has a data viewing area on the left side and a control panel on the right side. The viewing area can have several window layouts (e.g. one window, two windows, or four windows) readily changeable by the user. On the control panel, tool buttons can be grouped based on their functionality. In the example shown in FIG. 12, the group on the top provides basic viewing control functions, such as setting the window layout and data orientation, and several assisting tools such as pixel intensity and distance measurement. The group in the middle is a main function unit that has tool buttons for segmentation and editing. An exemplary editing system according to an embodiment of the invention loads standard DICOM (Digital Imaging and Communications in Medicine) data. In the embodiment illustrated, up to four datasets can be loaded and displayed at the same time, although other embodiments are not limited to this number. In a display window, the data can be displayed in either 2D or 3D.

Segmentation

Figure 13:
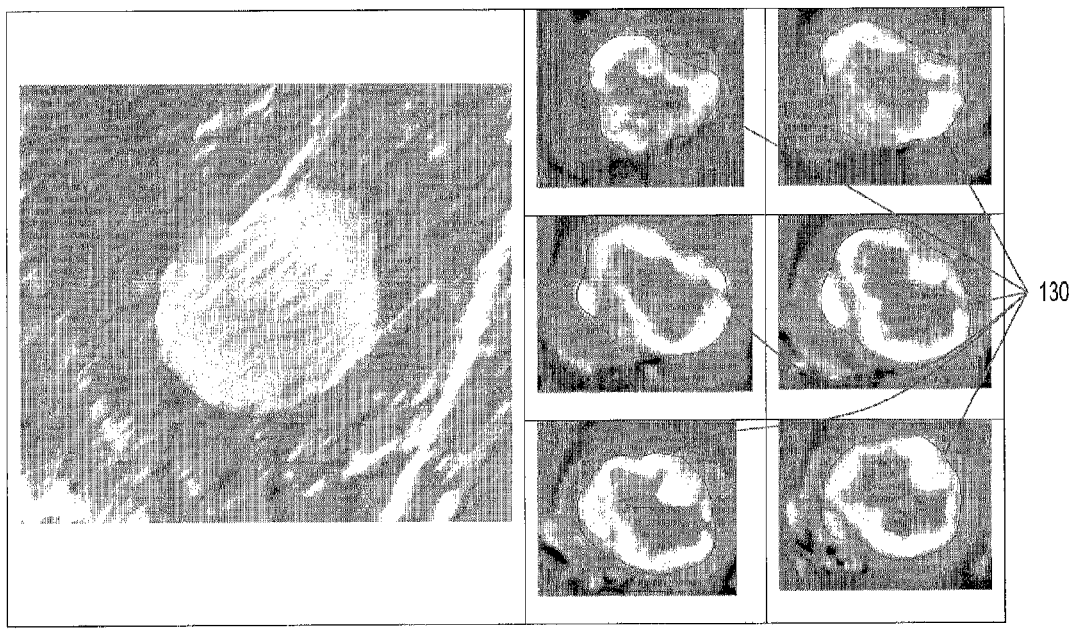
FIG. 13 shows a rendering of a whole segmented lesion in 2D and 3D, according to an embodiment of the invention.

The main functional objective of this system is to perform lesion segmentation in MR images. In an exemplary embodiment of the invention, to start a new segmentation, user first draws a 2D rectangle (i.e. a bounding box) which encloses the lesion to be segmented. Then user clicks on a "start segmentation" button. The backend algorithm, such as an algorithm according to an embodiment of the invention described above, is called to perform segmentation on the selected lesion. The segmentation result can be displayed on top of the original data as shown in the left windows in FIG. 12. The top-left window in this example displays 2D images while the bottom-left window shows a 3D rendering result of the data. The whole segmented lesion is rendered as shown in FIG. 13, where the segmented lesion is represented in 3D on the left side and in 2D on the right side. The segmentation result is represented by the lesion contours 130 on the current plane or slice. A user may scroll the 2D images slice by slice. In the 3D display, the surface of the segmented lesion overlays the volumetric image. A user can rotate the 3D image to visually exam the lesion.

Editing

Computer aided tools in medical imaging are always prone to error and are regarded as a second reader and helper to clinicians. Therefore, with any clinical medical image analysis system, a set of editing and correction tools are useful. After a semi-automatic lesion segmentation algorithm according to an embodiment of the invention is applied to delineate the boundaries of tumors, if the results are not sufficiently accurate, for example in case of blurry or soft lesion boundaries, editing tools can be provided to the user to fine-tune the result, e.g. by drawing corrections to the target region and its background. According to an embodiment of the invention, different segmentation editing algorithms have been developed and are part of the application.

Since the initial segmentation may be unsatisfactory, an editing system according to an embodiment of the invention allows a user to interactively revise the segmentation. The user analyses the visual information displayed on the screen and uses a plurality of 2D and 3D editing tools to edit the result. The editing tools are semi-automatic in that they require user interaction as guidance but do not apply it to the segmentation directly. This is a difference from a fully manual segmentation.

Figure 14:
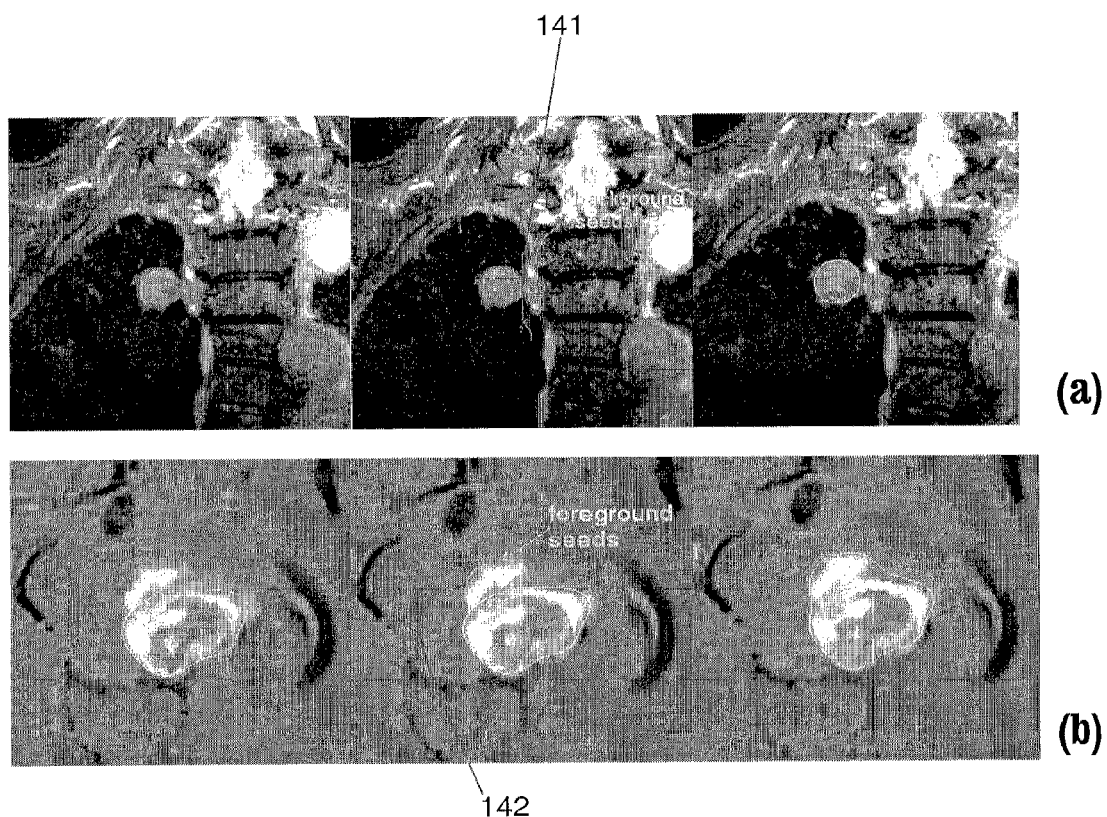
FIG. 14 illustrates 2D pen tool editing, according to an embodiment of the invention.

2D Pen Tool: With this tool, a user can draw a 2D stroke that is close to or intersects with the existing segmentation. Depending on whether to add to the segmentation or to remove a part from the segmentation, the user drawn points are treated as either foreground seed points or background seed points. In one exemplary, non-limiting implementation, the add and remove functions are invoked by the left and right mouse buttons, respectively. FIG. 14 illustrates 2D pen tool editing. The top row illustrates removal from the segmentation by drawing background seeds 141, while the bottom row illustrates adding to the segmentation by drawing foreground seeds 142. The images on the left are the initial segmentations. The ones in the middle show user drawn seed points, either foreground or background. The images on the right are the results after applying the 2D Pen Tool.

Figure 15:
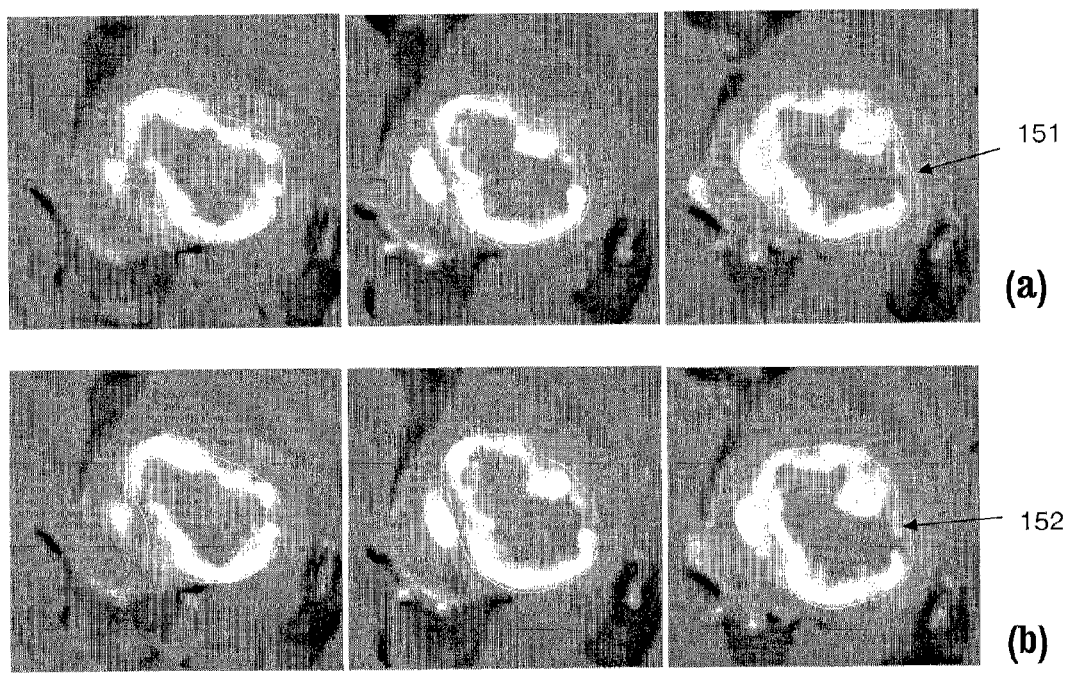
FIG. 15 illustrates 3D pen tool editing, according to an embodiment of the invention.

3D Pen Tool: The interaction of this editing tool is similar to the 2D pen tool, i.e. user draws a 2D stroke to either add to or remove from the segmentation. The only difference from 2D pen tool is that it works on 3D. The added or removed part of the segmentation is not only on the slice where user draws the stroke, as the seeds are applied to other slices as well. Therefore the segmentation is revised on 3D. FIG. 15 illustrates 3D pen tool editing. The top row shows three consecutive slices showing the initial segmentation indicated by contour 151 in the right hand image, while the bottom row shows the segmentation, indicated by contour 152 in the right hand image, after applying the 3D pen tool on the same slices.

Figure 16:
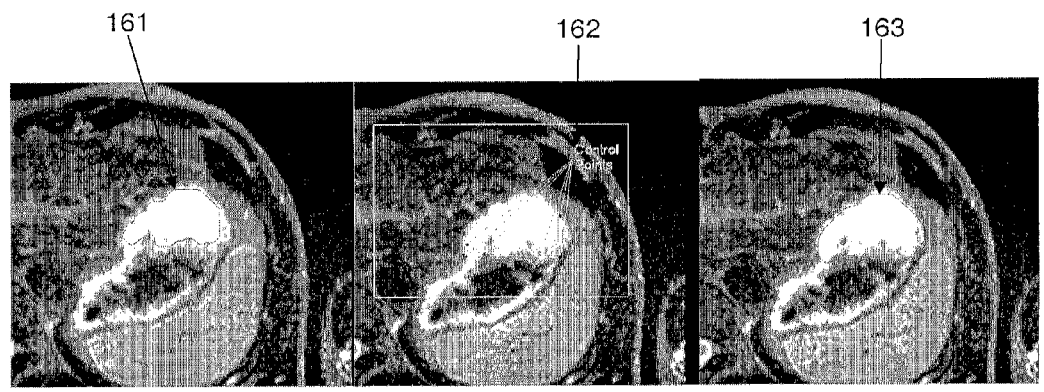
FIG. 16 shows an example of using a live wire editing tool to edit a segmentation, according to an embodiment of the invention.

Live-wire: The live wire tool provides the user with another efficient 2D editing tool. For the 2D pen tool, the seed points are provided by the user, as user draws points on the screen. It is hard for the user to draw the seeds exactly on a desired location such as a boundary. With a live wire tool, the user only needs to select one or more control points on the screen, and an editing system according to an embodiment of the invention automatically finds the shortest path between two control points and connects them together to form foreground or background seed points. FIG. 16 shows an example of using a live wire editing tool to edit a segmentation. The left image shows the original segmentation 161; the middle image shows the user drawn control points 162 after which the application connects the control points with a shortest path; the right image shows the result 163 after live wire editing. This editing method offers the user more freedom in choosing the foreground or background seed points. The user needs not to draw the seeds exactly on the desired boundaries.

Figure 17:
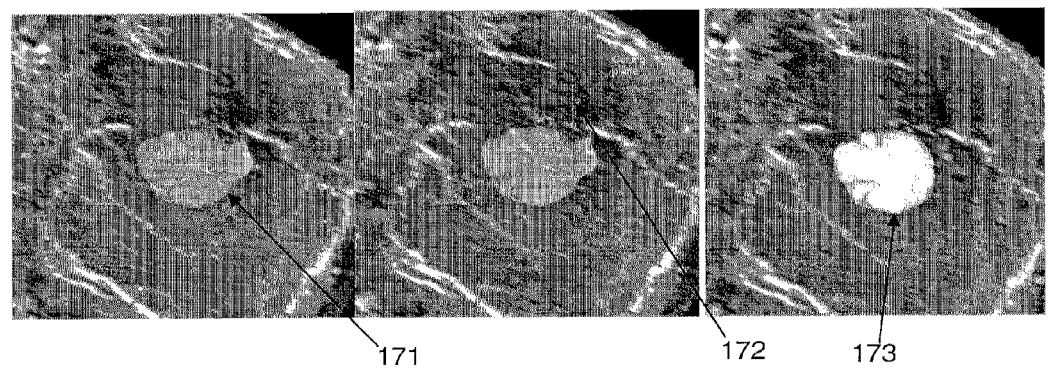
FIG. 17 illustrates a 3D cutting tool, according to an embodiment of the invention.

3D Cutting: 3D cutting is often used by a user to remove an undesired part from a segmentation. A user rotates the data to a right angle and draws a line to indicate the cutting plane. The application then cuts the segmentation based on this plane. FIG. 17 illustrates a 3D cutting tool. The left image shows the original segmentation 171; the middle image shows the user drawn line 172 indicating where to cut; the right image shows the segmentation 173 after cutting.

Figure 18:
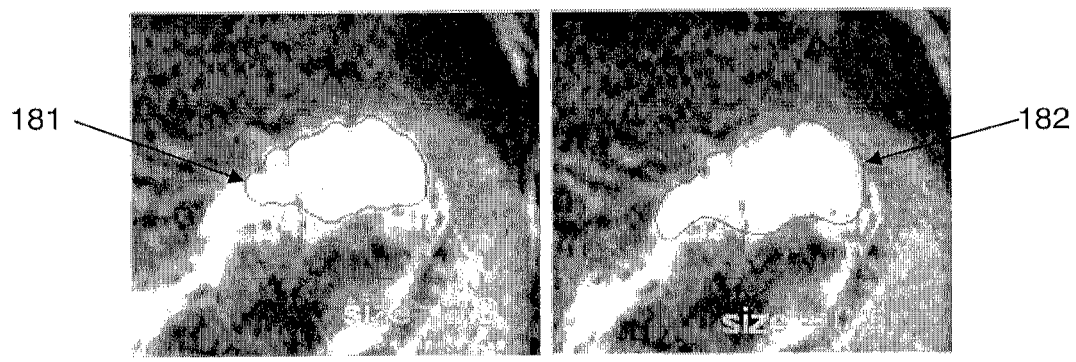
FIG. 18 illustrates adjusting the size parameter, according to an embodiment of the invention.
Figure 19:
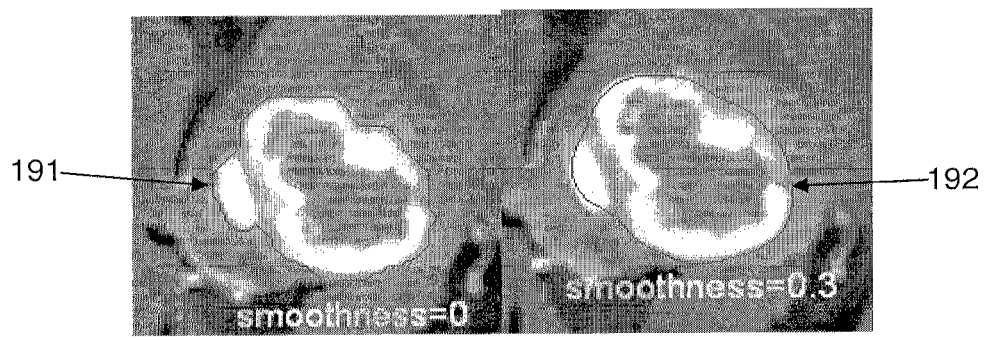
FIG. 19 illustrates adjusting the smoothness parameter, according to an embodiment of the invention.

Parameter Tuning: There are two parameters a user can set to adjust the segmentation: size and smoothness. In some cases, where the object is either under or over segmented, the user can adjust the size parameter to get a better result. The size parameter ranges from −1.0 to +1.0. Adjusting the segmentation with a negative parameter value results in a smaller segmentation and vice versa. The smoothness parameter, with a range from 0.0 to 1.0, can be used to adjust the smoothness of the surface of the segmented lesion. FIG. 18 illustrates adjusting the size parameter. The left side shows the original segmentation 181, while the right side shows the segmentation result 182 after adjusting size parameter to 0.6. FIG. 19 illustrates adjusting the smoothness parameter. The left side shows the original segmentation 191, with smoothness=0.0, while the right side shows the segmentation result 192 after adjusting smoothness parameter to 0.3.

Figure 20:
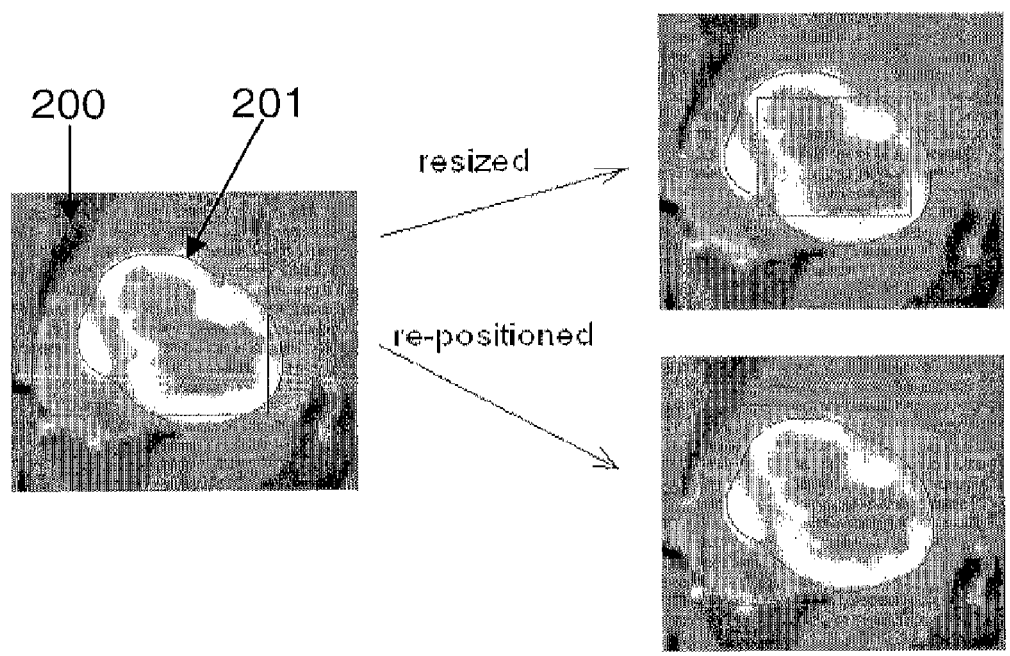
FIG. 20 illustrates how an original bounding box can be resized or repositioned, according to an embodiment of the invention.
Figure 21:
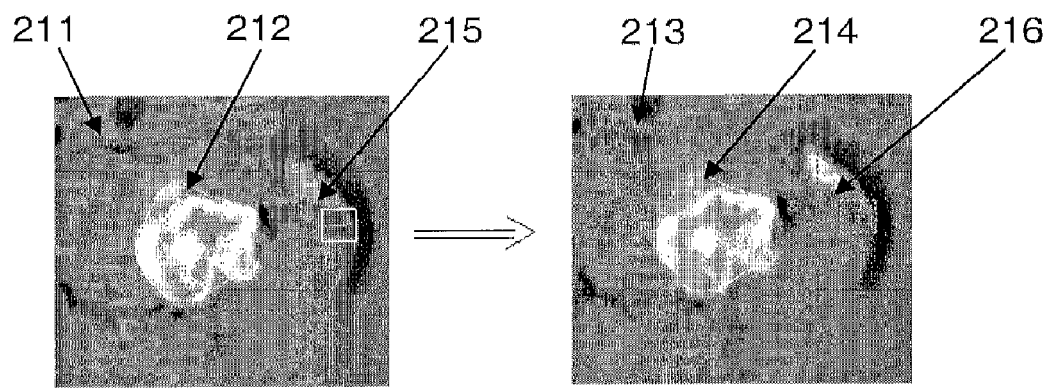
FIGS. 21(a)-(b) illustrate depth-padding the depth of the bounding box, according to an embodiment of the invention.
Figure 21:
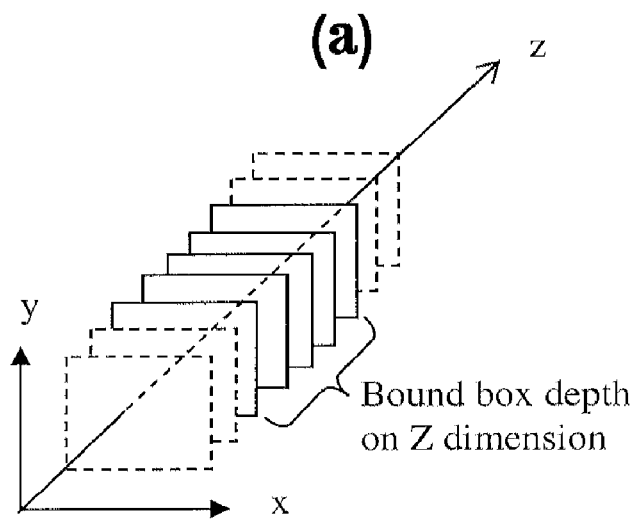

Bounding Box Editing: To start a new segmentation, a user draws a bounding box to enclose the lesion to be segmented. The bounding box defines a volume of interest (VOI) for a segmentation algorithm according to an embodiment of the invention to work with. The segmentation is bounded by the box and all following editing steps are also limited to be inside this VOI. Since the bounding box is first selected on a 2D slice, it may or may not cover the whole lesion in 3D. Therefore, an editing system according to an embodiment of the invention allows the user to adjust a bounding box in several ways. First, it can be resized and re-positioned in 2D. Second, it can be adjusted in the third dimension, an operation referred to as depth-padding. FIG. 20 illustrates how an original bounding box 200 can be resized or repositioned to encompass the region indicated by contour 201. If the user only wants the dark area inside this region, he/she may resize or reposition the bounding box to only enclose the dark area as shown in FIG. 20. Depth-padding involves changing the depth of the bounding box as displayed in FIGS. 21(a)-(b). To better visualize the depth of the bounding box, a 2D rectangle is drawn on all slices along z dimension. Within the depth range of the bounding box, the rectangle 211 and segmentation 212 are displayed in solid lines, as shown on the left side of FIG. 21(a). Outside the depth range of the bounding box, the rectangle 213 and segmentation 214 is displayed in dotted lines, as shown on the right side of FIG. 21(a). A schematic view of the bounding boxes along the z-axes, both within and outside the depth range, is shown in FIG. 21(b). The purpose of using solid and dashed line representations is to let the user easily see the depth of the box and make adjustments accordingly. In an exemplary, non-limiting embodiment of the invention, to adjust the depth-padding, the user can click on the "+" or "−" sign 215, 216 attached to the box on each slice. Clicking on a minus sign removes the current slice and beyond from the bounding box while clicking on a plus sign increases the depth up-to this slice.

Figure 22:
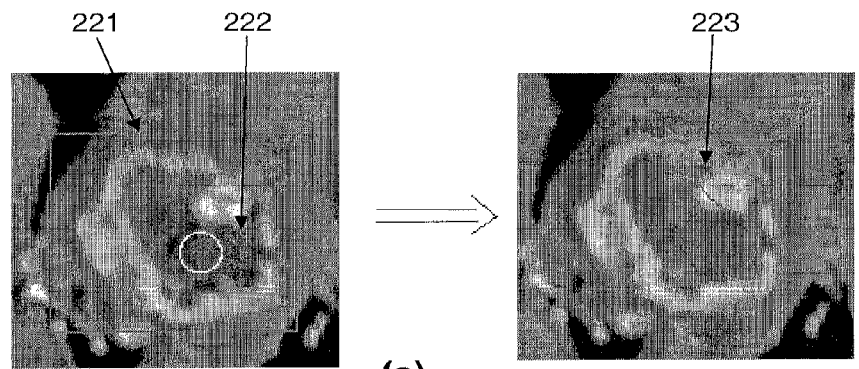
FIG. 22 illustrates adjusting the seed area, according to an embodiment of the invention.
Figure 22:
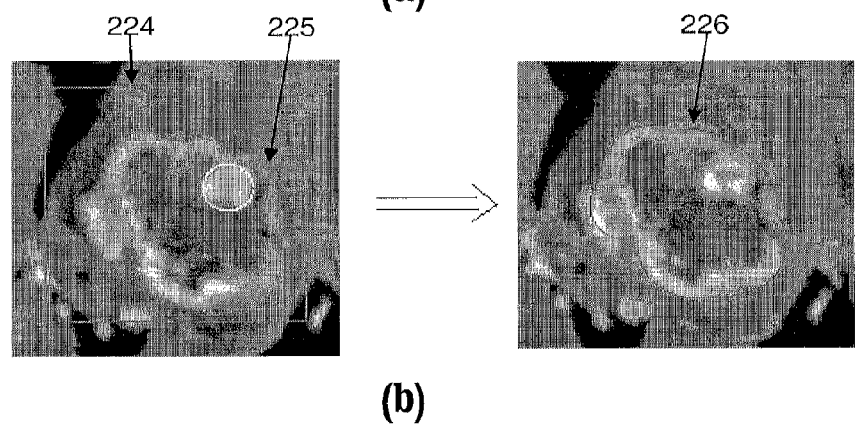

Seed Area Selection: In addition to the bounding box, another adjustable user input for segmentation is seed area. A seed area indicates where the lesion foreground is located. It helps a segmentation algorithm according to an embodiment of the invention to better "understand" input data, i.e. knowing which part of the data is the segmentation target. A user can adjust the seed area by re-positioning it or resizing it as shown in FIG. 22. In this example, different seed areas with the same bounding box result in different segmentations. The top row illustrates a seed area 221 inside a bounding box 222 set at the dark region on the left side, and the segmentation 223 on the right side covers the dark region. The bottom row, left side, illustrates a seed area 224 inside bounding box 225 moved to the bright region, and the segmentation 226 on the right side covers the bright area.

Reporting

An editing system according to an embodiment of the invention provides a reporting tool to help a user with statistical information about the segmented lesion(s). To radiologists, the ultimate goal of segmenting lesions is to provide intuitive statistical information such as lesion volume, diameter, etc. With this information, doctors are able to perform further pathological analysis during diagnosis, screening and evaluation of treatment. Tumor diameter is considered to be a prognostic indicator of cancer staging.

Figure 23:
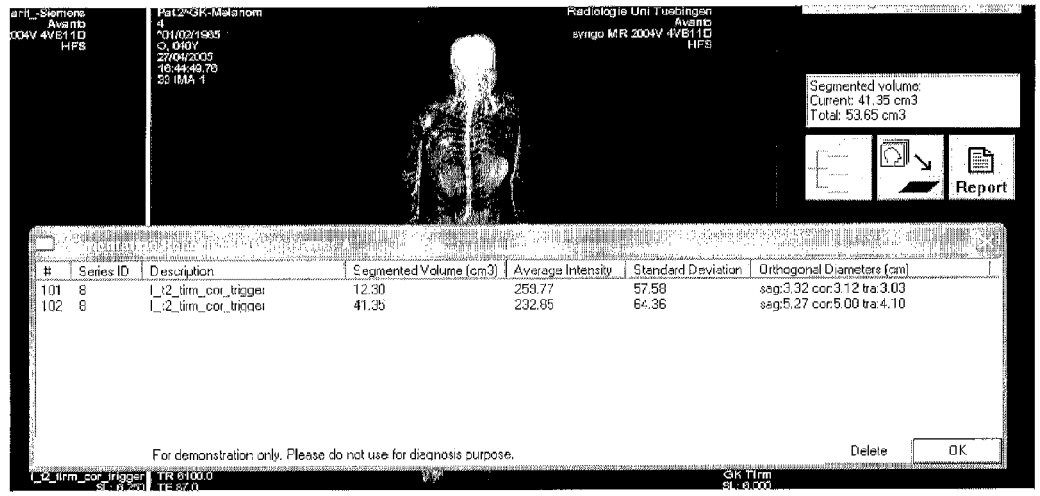
FIG. 23 shows a lesion segmentation report according to an embodiment of the invention.

In an editing system according to an embodiment of the invention, lesion information is presented in reports. According to a non-limiting embodiment of the invention, for each lesion, the following information is collected after each segmentation: volume, average intensity, standard deviation, and orthogonal diameters. The diameters are the largest distance along each orthogonal axis (X, Y and Z). All lesions belonging to a same study are listed in the same reporting table. A summary report showing the total lesion volume of the study can be displayed on the control panel as shown in the segmentation report shown in FIG. 23.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 24:
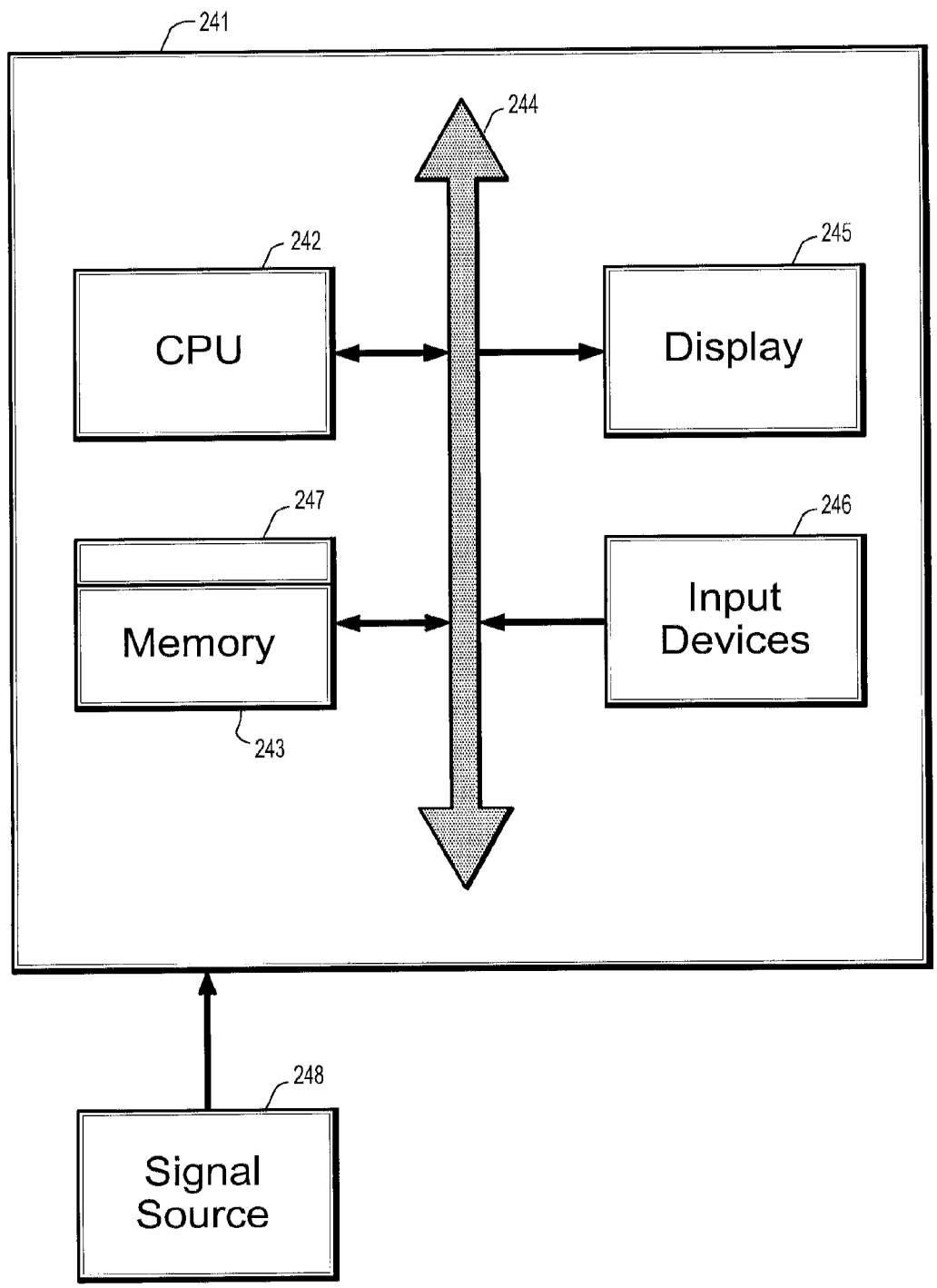
FIG. 24 is a block diagram of an exemplary computer system for implementing a method for lesion segmentation for 3-dimensional whole body magnetic resonance imaging, according to an embodiment of the invention.

FIG. 24 is a block diagram of an exemplary computer system for implementing a lesion and tumor segmentation method for 3D whole body magnetic resonance imaging according to an embodiment of the invention. Referring now to FIG. 24, a computer system 241 for implementing the present invention can comprise, inter alia, a central processing unit (CPU) 242, a memory 243 and an input output (I/O) interface 244. The computer system 241 is generally coupled through the I/O interface 244 to a display 245 and various input devices 246 such as a mouse and a keyboard. The support circuits can include circuits such as cache, power supplies, clock circuits, and a communication bus. The memory 243 can include random access memory (RAM), read only memory (ROM), disk drive, tape drive, etc., or a combinations thereof. The present invention can be implemented as a routine 247 that is stored in memory 243 and executed by the CPU 242 to process the signal from the signal source 248. As such, the computer system 241 is a general purpose computer system that becomes a specific purpose computer system when executing the routine 247 of the present invention.

The computer system 241 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for lesion segmentation in 3-dimensional (3D) digital images comprising the steps of:
providing a digitized 3D image, said image comprising a plurality of intensities associated with a 3D grid of voxels;
selecting a 2D region of interest (ROI) from said 3D image, said ROI containing a suspected lesion, extending borders of said ROI to 3D forming a volume of interest (VOI), wherein voxels on said borders of said VOI are initialized as background voxels and voxels in an interior of said VOI are initialized as foreground voxels;
propagating a foreground and background voxel competition wherein for each voxel in said VOI, having each neighbor voxel in a neighborhood of said voxel attack said voxel, and, if said attack is successful, updating a label and strength of said voxel with that of said successful attacking voxel; and
evolving a surface between the foreground and background voxels in 3D until an energy functional associated with said surface converges in value, wherein said surface segments said suspected lesion from said image, wherein evolving said surface in 3D comprises:
computing a surface evolution speed for each voxel along the zero level set according to $$\frac{\partial S}{\partial t} = \left[ \left( I - \frac{\int_{K_{in}} G(I) d\Omega}{\int_{K_{in}} d\Omega} \right)^2 - \left( I - \frac{\int_{K_{out}} G(I) d\Omega}{\int_{K_{out}} d\Omega} \right)^2 + \alpha\kappa \right] N,$$

wherein S represents said surface, I is the image intensity function, $\Omega$ is the domain of the VOI in the image, G(I) is a Gaussian kernel with zero mean and a predetermined standard deviation, $K_{in}$ and $K_{out}$ are truncated domains of the Gaussian kernel inside and outside the surface, respectively, $\kappa$ is a curvature function for smoothing the surface S, $\alpha$ is a weight of the smoothing, and N is a normal vector to the surface S;
moving the surface by updating voxels representing said surface; and
updating statistics of said Gaussian kernel and updating a narrowband about said updated surface.

2. The method of claim 1, wherein said neighborhood is a Moore neighborhood of 26 voxels surrounding said current voxel.

3. The method of claim 1, wherein an attack is deemed successful if $$g(\|v_a - v_d\|_2) \cdot s_a^t > s_d^{t+1},$$

wherein $v_x$ is an image intensity at voxel x, $s_x^t$ is a strength of voxel x at iteration step t, and g is an image characteristic function defined as $$g(v) = 1 - \frac{v}{\max_{\forall v} \|v\|}$$

wherein said maximum is evaluated over all voxels in said VOI.

4. The method of claim 3, wherein said current voxel $s_d^t$ strength is updated according to $$s_d^{t+1} = g(v_a) \cdot s_a^t,$$

wherein $s_a^t$ is a strength of said successful attacking voxel.

5. The method of claim 1, further comprising initializing said surface between the foreground and background voxels by converting said initial segmentation into a level set representation by computing weighted local intensity means and extending values from a zero level set, wherein said level set has values less than zero inside said initial surface, values greater than zero outside said initial surface and values equal to zero at the surface.

6. The method of claim 1, wherein said energy functional associated with said surface is of the form $$E(S) = \int [\chi_{in}(I - \text{mean}_{in})^2 + \chi_{out}(I - \text{mean}_{out})^2] d\Omega,$$

where $\chi$ is an indicator function for an interior or exterior of the surface S, $\Omega$ is the image domain, I: $\Omega \to R$ is the image intensity function, and $\text{mean}_{in/out}$ is a mean intensity of a region inside and outside the surface, respectively.

7. The method of claim 1, further comprising downsampling said VOI from an original resolution to a coarser resolution, propagating competing foreground and background voxels and evolving a surface between the foreground and background voxels in 3D to segment said lesion, and upsampling said segmentation to said original resolution.

8. A method for lesion segmentation in 3-dimensional (3D) whole body digital images comprising the steps of:

providing a digitized 3D whole body image, said image comprising a plurality of intensities associated with a 3D grid of voxels;

selecting a 2D region of interest (ROI) from said 3D image, said ROI containing a suspected tumor lesion;

extending said ROI into 3-dimensions forming a volume of interest (VOI);

iterating a foreground and background voxel competition wherein an initial segmentation of foreground voxels from background voxels is obtained;

initializing a surface between the foreground and background voxels;

computing a surface curvature and statistics of 3D Gaussian kernels in domain regions around each voxel on the surface to calculate an overall surface evolution speed for each voxel along the zero level set;

moving the surface by altering the level set function according to $$\frac{\partial S}{\partial t} = \left[ \left( I - \frac{\int_{K_{in}} G(I) d\Omega}{\int_{K_{in}} d\Omega} \right)^2 - \left( I - \frac{\int_{K_{out}} G(I) d\Omega}{\int_{K_{out}} d\Omega} \right)^2 + \alpha \kappa \right] N,$$

wherein S represents said surface, I is the image intensity function, $\Omega$ is the domain of the VOI in the image, G(I) is a Gaussian kernel with zero mean and a predetermined standard deviation, $K_{in}$ and $K_{out}$ are truncated domains of the Gaussian kernel inside and outside the surface, respectively, $\kappa$ is a curvature function for smoothing the surface S, $\alpha$ is a weight of the smoothing, and N is a normal vector to the surface S; and updating statistics of said 3D Gaussian kernels in the domain regions around each voxel on the surface, and updating said surface, until an energy functional associated with said surface converges in value, wherein said surface segments said suspected lesion from said whole body image.

9. The method according to claim 8, wherein iterating a foreground and background voxel competition comprises:

initializing voxels on a border of said VOI as background voxels and voxels in an interior of said VOI as foreground voxels;

initializing a strength function for each seed voxel; and for each current voxel in said VOI, having each neighbor voxel in a neighborhood of said current voxel attack said current voxel, and, if said attack is successful, updating a label and strength of said current voxel with that of said successful attacking voxel.

10. The method of claim 8, further comprising displaying said segmentation result, providing an interface adapted for receiving editing commands for editing said segmentation result, and processing any such commands received through said interface.

11. The method of claim 10, wherein said editing tools include a 2D pen enabling a user to select additional foreground or background voxels in a 2D region.

12. The method of claim 10, wherein said editing tools include a 3D pen enabling a user to select additional foreground or background voxels in a 3D region.

13. The method of claim 10, wherein said editing tools include a live-wire enabling a user to draw additional foreground or background points on a screen, and further comprising finding a shortest path between said drawn points.

14. The method of claim 10, wherein said editing tools include a 3D cutting tool enabling a user to draw a line on a screen indicative of a cutting plane, and further comprising removing voxels from a segmented lesion based on a position of said cutting plane.

15. The method of claim 10, wherein said editing tools include a parameter tuning tool enabling a user to adjust a size and smoothness of a segmented lesion.

16. The method of claim 10, wherein said editing tools include a bounding box editor enabling a user to resize or reposition a bounding box in 2D, and to expand or shrink said bounding box along a third axis.

17. The method of claim 10, wherein said editing tools include a seed area selector enabling a user to indicate an area where a lesion is located, and to resize or reposition said area.

18. A method for lesion segmentation in 3-dimensional (3D) digital images comprising the steps of:

providing a digitized 3D image, said image comprising a plurality of intensities associated with a 3D grid of voxels;

selecting a 2D region of interest (ROI) from said 3D image, said ROI containing a suspected lesion and extending said ROI into 3-dimensions forming a volume of interest (VOI), wherein voxels on a border of said VOI are initialized as background voxels and voxels in an interior of said VOI are initialized as foreground voxels, and wherein a subset of said foreground voxels are initialized as center voxels, and a subset about a center of said lesion are initialized as surrounding voxels;

iterating a voxel competition wherein an initial segmentation of voxels into background, center, and surrounding voxels is obtained; and evolving surfaces between said center, surrounding, and background voxels in 3D until an energy functional associated with each said surface converges in value, wherein said surfaces segment said suspected lesion from said image and a surrounding region from a center region in said lesion, wherein evolving said surfaces in 3D comprises:

computing a surface evolution speed for each voxel of each surface along the zero level set according to $$\frac{\partial S_i}{\partial t} = [(I - u_k)^2 - (I - v_k)^2 - (I - w_k)^2 + \alpha \kappa_i] N_i,$$

wherein $S_i$ represents one of said surfaces where i=1 or 2, I is the image intensity function, $\kappa_i$ is a curvature function for smoothing each surface $S_i$, $N_i$ is a normal vector to the surface $S_i$, $u_k$ is a kernel mean inside surface $S_1$, computed over a ball using voxels inside surface $S_1$, $v_k$ is a kernel mean computed over a ball using voxels outside surface $S_1$ and inside surface $S_2$, and $w_k$ is a kernel mean compute over a ball outside both surfaces, wherein the kernel means can be calculated according to $$u_k = \frac{\int_B H_1(x)H_2(x)k(x)I(x)dx}{\int_B H_1(x)H_2(x)k(x)dx},$$

$$v_k = \frac{\int_B (1-H_1(x))H_2(x)k(x)I(x)dx}{\int_B (1-H_1(x))H_2(x)k(x)dx},$$

$$w_k = \frac{\int_B (1-H_1(x))(1-H_2(x))k(x)I(x)dx}{\int_B (1-H_1(x))(1-H_2(x))k(x)dx},$$

wherein B indicates a ball region, $H_i$ is a Heaviside step function that is a function of the level step function, k is a kernel, x is an image voxel, and I(x) is the image intensity inside the ball at voxel x.

19. The method of claim 18, wherein iterating a voxel competition comprises having, for each voxel in said VOI, each neighbor voxel in a neighborhood of said voxel attacking said voxel, and, if said attack is successful, updating a label and strength of said voxel with that of said successful attacking voxel, wherein an attack is deemed successful if $$g(\|v_a - v_d\|_2) \cdot s_a^t > s_d^{t+1},$$

wherein $v_x$, is an image intensity at voxel x, $s_x^t$ is a strength of voxel x at iteration step t, and g is an image characteristic function defined as $$g(v) = 1 - \frac{v}{\max_{\forall v} \|v\|}$$

wherein said maximum is evaluated over all voxels in said VOI.

20. The method of claim 19, wherein iterating a voxel competition further comprises having competing background and foreground voxels attack each other, and having competing center and surrounding voxels attack each other.

21. The method of claim 19, wherein iterating a voxel competition further comprises having competing center, surrounding, and background voxels attack each other.

22. The method of claim 18, wherein evolving a surface comprises:
computing a surface curvature and statistics of 3D Gaussian kernels in domain regions around each voxel on the surface to calculate an overall surface evolution speed for each voxel along the zero level set;
moving the surface by altering the level set function; and
updating statistics of said 3D Gaussian kernels in the domain regions around each voxel on the surface, and updating said surface.

23. The method of claim 22, wherein evolving surfaces between said center, surrounding, and background voxels in 3D further comprises initializing a surface between said foreground and said background voxels, evolving said surface between the foreground and background voxels in 3D until said energy functional associated with said surface converges in value, and initializing a surface between said center and said surrounding voxels, and evolving said surface between the center and surrounding voxels in 3D until said energy functional associated with said surface converges in value.

24. The method of claim 22, wherein evolving surfaces between said center, surrounding, and background voxels in 3D further comprises initializing a first surface between said foreground and said background voxels and a second surface between said center and said surrounding voxels, and propagating both surfaces until said energy functionals associated with each said surface converge in value.

25. A program storage device readable by a computer, tangibly embodying a program of instructions executable by the computer to perform the method steps for lesion segmentation in 3-dimensional (3D) digital images, said method comprising the steps of:
providing a digitized 3D image, said image comprising a plurality of intensities associated with a 3D grid of voxels;
selecting a 2D region of interest (ROI) from said 3D image, said ROI containing a suspected lesion, extending borders of said ROI to 3D forming a volume of interest (VOI), wherein voxels on said borders of said VOI are initialized as background voxels and voxels in an interior of said VOI are initialized as foreground voxels;
propagating a foreground and background voxel competition wherein for each voxel in said VOI, having each neighbor voxel in a neighborhood of said voxel attack said voxel, and, if said attack is successful, updating a label and strength of said voxel with that of said successful attacking voxel; and
evolving a surface between the foreground and background voxels in 3D until an energy functional associated with said surface converges in value, wherein said surface segments said suspected lesion from said image, wherein evolving said surface in 3D comprises:
computing a surface evolution speed for each voxel along the zero level set according to $$\frac{\partial S}{\partial t} = \left[ \left(I - \frac{\int_{K_{in}} G(I) d\Omega}{\int_{K_{in}} d\Omega}\right)^2 - \left(I - \frac{\int_{K_{out}} G(I) d\Omega}{\int_{K_{out}} d\Omega}\right)^2 + \alpha\kappa \right] N,$$

wherein S represents said surface, I is the image intensity function, $\Omega$ is the domain of the VOI in the image, G(I) is a Gaussian kernel with zero mean and a predetermined standard deviation, $K_{in}$ and $K_{out}$ are truncated domains of the Gaussian kernel inside and outside the surface, respectively, $\kappa$ is a curvature function for smoothing the surface S, $\alpha$ is a weight of the smoothing, and N is a normal vector to the surface S;
moving the surface by updating voxels representing said surface; and
updating statistics of said Gaussian kernel and updating a narrowband about said updated surface.

26. The computer readable program storage device of claim 25, wherein said neighborhood is a Moore neighborhood of 26 voxels surrounding said current voxel.

27. The computer readable program storage device of claim 25, wherein an attack is deemed successful if $$g(\|v_a - v_d\|_2) \cdot s_a^t > s_d^{t+1},$$

wherein $v_x$, is an image intensity at voxel x, $s_x^t$ is a strength of voxel x at iteration step t, and g is an image characteristic function defined as $$g(v) = 1 - \frac{v}{\max_v \|v\|}$$

wherein said maximum is evaluated over all voxels in said VOI.

28. The computer readable program storage device of claim 27, wherein said current voxel $s_d^t$ strength is updated according to $$s_d^{t+1} = g(v_a) \cdot s_a^t,$$

wherein $s_a^t$ is a strength of said successful attacking voxel.

29. The computer readable program storage device of claim 25, the method further comprising initializing said surface between the foreground and background voxels by converting said initial segmentation into a level set representation by computing weighted local intensity means and extending values from a zero level set, wherein said level set has values less than zero inside said initial surface, values greater than zero outside said initial surface and values equal to zero at the surface.

30. The computer readable program storage device of claim 25, wherein said energy functional associated with said surface is of the form $$E(S) = \int [\chi_{in}(I - \mathrm{mean}_{in})^2 + \chi_{out}(I - \mathrm{mean}_{out})^2] d\Omega,$$

where $\chi$ is an indicator function for an interior or exterior of the surface S, $\Omega$ is the image domain, I: $\Omega \to R$ is the image intensity function, and $\mathrm{mean}_{in/out}$ is a mean intensity of a region inside and outside the surface, respectively.

31. The computer readable program storage device of claim 25, the method further comprising downsampling said VOI from an original resolution to a coarser resolution, propagating competing foreground and background voxels and evolving a surface between the foreground and background voxels in 3D to segment said lesion, and upsampling said segmentation to said original resolution.

32. The computer readable program storage device of claim 25, the method further comprising displaying said segmentation result, providing an interface adapted for receiving editing commands for editing said segmentation result, and processing any such commands received through said interface.

33. The computer readable program storage device of claim 32, wherein said editing tools include a 2D pen enabling a user to select additional foreground or background voxels in a 2D region.

34. The computer readable program storage device of claim 32, wherein said editing tools include a 3D pen enabling a user to select additional foreground or background voxels in a 3D region.

35. The computer readable program storage device of claim 32, wherein said editing tools include a live-wire enabling a user to draw additional foreground or background points on a screen, and further comprising finding a shortest path between said drawn points.

36. The computer readable program storage device of claim 32, wherein said editing tools include a 3D cutting tool enabling a user to draw a line on a screen indicative of a cutting plane, and further comprising removing voxels from a segmented lesion based on a position of said cutting plane.

37. The computer readable program storage device of claim 32, wherein said editing tools include a parameter tuning tool enabling a user to adjust a size and smoothness of a segmented lesion.

38. The computer readable program storage device of claim 32, wherein said editing tools include a bounding box editor enabling a user to resize or reposition a bounding box in 2D, and to expand or shrink said bounding box along a third axis.

39. The computer readable program storage device of claim 32, wherein said editing tools include a seed area selector enabling a user to indicate an area where a lesion is located, and to resize or reposition said area.

* * * * *